United States Patent
Futaki

(10) Patent No.: US 9,565,600 B2
(45) Date of Patent: Feb. 7, 2017

(54) RADIO COMMUNICATION SYSTEM, RADIO TERMINAL, RADIO STATION, EVOLVED PACKET CORE, AND INFORMATION GATHERING METHOD

(71) Applicant: NEC Corporation, Tokyo (JP)

(72) Inventor: Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 22 days.

(21) Appl. No.: 14/348,575

(22) PCT Filed: Sep. 28, 2012

(86) PCT No.: PCT/JP2012/075234
§ 371 (c)(1),
(2) Date: Mar. 28, 2014

(87) PCT Pub. No.: WO2013/047833
PCT Pub. Date: Apr. 4, 2013

(65) Prior Publication Data
US 2014/0295847 A1    Oct. 2, 2014

(30) Foreign Application Priority Data

Sep. 30, 2011 (JP) ................. 2011-218704

(51) Int. Cl.
H04W 36/00 (2009.01)
H04W 24/10 (2009.01)
H04W 88/06 (2009.01)

(52) U.S. Cl.
CPC ..... H04W 36/0055 (2013.01); H04W 36/0083 (2013.01); H04W 24/10 (2013.01); H04W 36/0066 (2013.01); H04W 88/06 (2013.01)

(58) Field of Classification Search
None
See application file for complete search history.

(56) References Cited

U.S. PATENT DOCUMENTS

2004/0002334 A1 * 1/2004 Lee ............... H04W 36/0083
455/436
2006/0121906 A1 6/2006 Stephens et al.
(Continued)

FOREIGN PATENT DOCUMENTS

CN    102164375 A    8/2011

OTHER PUBLICATIONS

3GPP TS 37.320 V10.0.0 (<URL> http:www.3gpp.org/ftp/Specs/html-info/37320.htm), Dec. 2010, 17 pages.
(Continued)

Primary Examiner — Daniel Lai
(74) Attorney, Agent, or Firm — Finnegan, Henderson, Farabow, Garrett & Dunnere LLP

(57) ABSTRACT

The present invention is a radio communication system in which a radio terminal obtains measurement information designated by a network in an idle state and reports the obtained measurement information in an active state, the radio communication system comprising: a radio station con to operate a first cell of a first Radio Access Technology, wherein, in the first cell, the radio station comprises; notifying means configured to notify the radio terminal of first configuration information related to obtainment of the measurement information in the first cell; and a request means configured to request the radio terminal to obtain, after the radio terminal moves to a second cell of a second Radio Access Technology different from the first Radio Access Technology, the measurement information in the second cell.

27 Claims, 15 Drawing Sheets

(56) References Cited

U.S. PATENT DOCUMENTS

| | | | | |
|---|---|---|---|---|
| 2011/0194427 | A1* | 8/2011 | Shirota | H04W 36/0022 370/252 |
| 2011/0201279 | A1* | 8/2011 | Suzuki | H04W 24/10 455/67.11 |
| 2011/0250910 | A1* | 10/2011 | Lee | H04W 24/10 455/466 |
| 2011/0306345 | A1* | 12/2011 | Wu | H04W 24/10 455/436 |
| 2012/0106506 | A1* | 5/2012 | Taaghol | H04W 36/0066 370/331 |
| 2012/0113837 | A1* | 5/2012 | Siomina | H04W 24/10 370/252 |
| 2012/0315949 | A1 | 12/2012 | Zhang et al. | |
| 2013/0090113 | A1* | 4/2013 | Persson | H04W 24/10 455/424 |

OTHER PUBLICATIONS

3GPP TS 32.422 V10.4.0 (<URL> http:www.3gpp.org/ftp/Specs/html-info/32422.htm), Jun. 2011, 115 pages.

Radio measurement collection for Minimization of Drive Tests (MDT), 3GPP TS 37.320 V10.2.0, 3GPP, Jun. 2011, pp. 1-17.

"Idle Mode Logged MDT reporting mechanism," Alcatel-Lucent, R2-102056, 3GPP TSG-RAN WG2 Meeting #69bis, Beijing, China, Apr. 12-16, 2010, 4 pages.

Technology Reports, NTT DOCOMO Inc., (<URL> http://www.nttdocomo.co.jp/binary/pdf/corporate/technology/rd/technical_journal/bn/vol17_3/vol17_3_006jp.pdf), vol. 17, No. 3, Oct. 2009, 9 pages.

"Re-configurability of logged MDT measurements," NTT DOCOMO, Inc., 3GPP TSG-RAN2 #70, R2102906, May 2010, 5 pages.

"MDT operation in networks that use equivalent PLMNs and/or RAN sharing," Nokia Siemens Networks, 3GPP TSG-RAN WG2 Meeting #75, R2-113775, Aug. 2011.

"Inter-RAT aspects of Logged MDT," NEC, 3GPP TSG RAN2 Meeting #76, R2-115809, Nov. 2011.

"MDT at roaming and inter-PLMN mobility," TeliaSonera, 3GPP TSG-RAN WG3 meeting #73, R3-111930, Aug. 2011.

Extended European Search Report mailed on Sep. 28, 2015 by the European Patent Office in counterpart European Patent Application No. 12836629.1.

Search Report issued from the Chinese Patent Office in counterpart Chinese Application No. 2012800482408 dated Nov. 1, 2016.

* cited by examiner

FIG. 9

| | | |
|---|---|---|
| LogMeasReport ::= | SEQUENCE { | |
| absoluteTimeStamp | AbsoluteTimeInfo, | ABSOLUTE TIME |
| traceReference | TraceReference, | TRACE REFERENCE INFORMATION |
| traceRecordingSessionRef | OCTET STRING (SIZE (2)), | TRACE COLLECTING SESSION INFORMATION |
| tce-Id | OCTET STRING (SIZE (1)), | TCE IDENTIFIER |
| logMeasInfoList | LogMeasInfoList, | LOG INFORMATION LIST |
| logMeasAvailable | ENUMERATED {true} OPTIONAL | LOG STORING INFORMATION |
| } | | |
| | | |
| LogMeasInfoList ::= | SEQUENCE (SIZE (1..maxLogMeasReport)) OF LogMeasInfo | |
| | | |
| LogMeasInfo ::= | SEQUENCE { | LOG INFORMATION |
| locationInfo | LocationInfo OPTIONAL, | LOCATION INFORMATION |
| relativeTimeStamp | INTEGER (0..7200), | RELATIVE TIME |
| LogMeasInfo-RAT | CHOICE { | |
| eutra-LogMeasInfo | Eutra-LogMeasInfo | LTE LOG INFORMATION |
| utra-LogMeasInfo | Utra-LogMeasInfo | UMTS LOG INFORMATION |
| } | | |
| } | | |
| | | |
| Eutra-LogMeasInfo ::= | SEQUENCE { | |
| servCellIdentity | CellGlobalIdEUTRA, | SERVING CELL ID |
| measResultServCell | SEQUENCE { | SERVING CELL MEASUREMENT RESULTS |
| rsrpResult | RSRP-Range, | RSRP |
| rsrqResult | RSRQ-Range, | RSRQ |
| }, | | |
| measResultNeighCells | SEQUENCE { | NEIGHBORING CELL MEASUREMENT RESULTS |
| : | : | |
| } | OPTIONAL, | |
| } | | |
| | | |
| Utra-LogMeasInfo ::= | SEQUENCE { | |
| servCellIdentity | CellIdentity, | SERVING CELL ID |
| measResultServCell | SEQUENCE { | SERVING CELL MEASUREMENT RESULTS |
| utra-RSCP | INTEGER (-5..91), | RSCP |
| utra-EcN0 | INTEGER (0..49), | Ec/No |
| }, | | |
| measResultNeighCells | SEQUENCE { | NEIGHBORING CELL MEASUREMENT RESULTS |
| : | : | |
| } | OPTIONAL, | |
| } | | |

RADIO COMMUNICATION SYSTEM, RADIO TERMINAL, RADIO STATION, EVOLVED PACKET CORE, AND INFORMATION GATHERING METHOD

CROSS-REFERENCE TO RELATED PATENT APPLICATIONS

This application is a National Stage Entry of International Application No. PCT/JP2012/075234, filed Sep. 28, 2012, which claims priority from Japanese Patent Application No. 2011-218704, filed Sep. 30, 2011. The entire contents of the above-referenced applications are expressly incorporated herein by reference.

TECHNICAL FIELD

The present invention relates to a radio communication system, radio terminal, a radio station, a network apparatus, and an information collection method.

BACKGROUND ART

In the 3GPP (3rd Generation Partnership Project), in order to reduce operation expense (OPEX) incurred in a drive-test by an operator, utilization of a radio terminal for measurement and report of such information that has been collected by the drive-test or information similar thereto is under study (Non Patent Literature 1). An ultimate object of the above-mentioned study is the minimization of execution of the drive-tests, and the technology related to this study is collectively called "MDT" (Minimization of Drive-Tests). An application target of the MDT is both UMTS (Universal Mobile Telecommunication System) and LTE (Long Term Evolution), which are cellular systems defined in 3GPP. The term "measurement" herein also includes "detecting" a certain specific situation.

In MDT, the following two methods are defined as a method for obtaining (that is, measurement and logging of the measurement results) and reporting measurement information by a radio terminal (Non Patent Literature 1).

1. Immediate MDT: The method that instructs a radio terminal to obtain and report measurement information in an active state; and 2. Logged MDT: The method that instructs a radio terminal to obtain measurement information in an idle state, and report the obtained measurement information in an active state.

In the study of MDT, making a determination which radio terminal is instructed to obtain and report measurement information in the network side, that is, control of obtaining and reporting measurement information through a radio terminal initiated by the network is a basic principle, and the following two methods are defined in Non Patent Literature 2.

A. Management based method (Management based MDT): The method that first defines an area to be a target for collection of measurement information in MDT, and then select one arbitrarily from radio terminals that stay in the area. It is also called as Area based method (Area based MDT).

B. Signaling based method (Signaling based MDT): The method that selects a specific radio terminal based on a individual ID (Identity) of the radio terminal.

Next, there will be described a logged MDT using a management based method in LTE studied in 3GPP with reference to FIG. 1. As shown in FIG. 1, a system of LIE assumed herein includes a radio terminal UE (User Equipment), a radio base station eNB (evolved NodeB), an network apparatus EPC (Evolved Packet Core) including such as a mobility management apparatus MME (Mobility Management Entity)/a home subscriber management server HSS (Home Subscriber Server) of a radio terminal, a network operation management apparatus EM (Element Manager) (also called as EMS: Element Management System), and trace information collecting apparatus (Trace Collection Entity). Then, in FIG. 1, the logged MDT using the management based method is executed in the following steps. Note that in FIG. 1, the UE is assumed to be in a RRC (Radio Resource Control)_Connected state (active mode) at the start of step S1001.

Step S1001: The UE notifies a connected eNB of terminal capability information (UE Capability Information) on radio access. At this time, support of the logged MDT (logged Measurements Idle) is notified together.

Step S1002: The EM(S) requests the eNB to execute the logged MDT on a management basis (Trace Activation Request). The instruction also includes configuration information necessary for executing the logged MDT.

Step S1003: The eNB selects the UE that is instructed to execute the logged MDT according to the request from the EM(s) as well as terminal capability information of the UE (UE selection). Although not shown in the figure, the eNB obtains in advance consent information (user consent) related to the detailed location information of the UE (e.g. GPS location information) from (MME that is included in) EPC. When necessary to report the detailed location information, the eNB may select a consent UE, and when not necessary, the eNB may select an unconsent UE.

Step S1004: The eNB notifies the UE of configuration information necessary for executing the logged MDT (Logged Measurement Configuration). This notification is also an instruction to execute the logged MDT.

Step S1005: The eNB changes the UE to a RRC_Idle state (idle mode) (RRC Connection Release).

Step S1006: The UE changes to a RRC_Idle state (RRC Connection Release).

Step S1007: The UE performs measurement for signals in the serving cell or neighboring cells at a predetermined timing. Herein, the measurement items may include received power (Reference Signal Received Power: RSRP) or received quality (Reference Signal Received Quality: RSRQ) of a known signal (Reference Signal: RS). Note that the measurement is performed for cell reselection or the like, but not for the logged MDT which is additional.

Step S1008: The UE logs the measurement results (RSRP or RSRQ) at a logging timing indicated by configuration information of the logged MDT. Note that in the specification, a combination of operations in steps S1007 and S1008 (or what includes at least these two operations) is called "logging of measurement results" (Log measurement results) for the sake of simplification, unless specifically described Step S1009: The UE performs a RRC connection request to become a RRC_Connected state in response to a predetermined trigger.

Step S1010: The eNB accepts the RRC connection request and notifies necessary information (RRC Connection Setup).

Step S1011: The UE transmits a confirmation message for RRC connection establishment (RRC Connection Setup Complete). In a series of operations from step S1009 to S1011, a RRC connection is established (RRC Connection Establishment). Herein, the UE that stores record of measurement results (log) transmits a message with the addition of information indicating storing the log (LogMeasAvailable) in the logged MDT.

Step S1012: The eNB requests a log report when notified of storing the log (UE Information Request (LogMeasReportReq)).

Step S1013: The UE reports a log in response to a request of the log report (UE Information Response (LogMeasReport)).

Step S1014: The eNB transfers the reported log to the TCE (Trace Recording Report).

The logged MDT on a management base method is realized through the above-described operations.

In the logged MDT, even when the UE moves from a cell having received configuration information of the logged MDT (that is, requested to execute the logged MDT) to a different cell, it is continued when a destination cell satisfies the predetermined conditions. The predetermined conditions herein are such as a cell that has the same Radio Access Technology (RAT) as the cell having received configuration information of the logged MDT, a cell that belongs to the same PLMN Id (Public Land Mobile Network) as the cell having received configuration information of the logged MDT, or a cell that belongs to a global cell Id (EUT RAN Cell Global Identifier: ECGI) and a tracking area (TA), both of which are indicated by the configuration information.

On the other hand, when a destination cell does not satisfy the predetermined conditions, for example, when moving to a cell of the different RAT, that is, a cell of the different type of system as shown in FIG. 2 (S1105: Cell reselection to UMTS cell), UE stops the logged MDT (S1106: Stop logging measurement results). At this time, the UE does not report a log even when being in a RRC_Connected state (S1109: RRC Connection Setup Complete) for update of location registration in the cell or the like (S1110: Location Update). Meanwhile, the UE restarts the logged MDT when moving again to a cell that satisfies the predetermined conditions. Note that when the UE newly receives configuration information of the logged MDT after moving to a cell that does not satisfy the predetermined conditions (that is, requested to execute the logged MDT), the stored configuration information of the logged MDT or the stored log is overwritten (or discarded).

CITATION LIST

Non-Patent Literature

Non Patent Literature 1
Journal of 3GPP TS37.320v10.0.0 (<URL> http://www.3gpp.org/ftp/Specs/html-info/37320.htm)
Non Patent Literature 2
Journal of 3GPP TS32.422v10.4.0 (<URL> http://www.3gpp.org/ftp/Specs/html-info/32422.htm)
Non Patent Literature 3
Journal of NTT DOCOMO Technical Journal Vol. 17 No. 3 (<URL> http://www.nadocomo.co.jp/binary/pdfcorporate/technology/rd/technical_journal/bn/vol17_3/vol17_3_006jp.pdf)

SUMMARY OF INVENTION

Technical Problem

Analysis of the related art by the present invention is described below.

In the above-described logged MDT, conceive a case that one UE receives configuration information of the logged MDT in the RAT-A cell (that is, requested to execute the logged MDT), and moves to a different cell of the RAT-B cell after obtaining a log in the RAT-A cell.

When moving to the RAT-B cell, the UE goes to the RRC_Connected state (active mode) in order to register a location thereof. Then, the UE stops the Logged MDT. In this case, in order to instruct the UE to continuously obtain measurement information by the Logged MDT from immediately after the UE has moved to the RAT-B cell (e.g., after the end of the location registration process), such a method is proposed that the configuration information of the Logged MDT in the RAT-B is newly notified to the UE. In order to achieve this, the configuration information of the Logged MDT needs to be newly notified to the UE, and thus the configuration information received in the RAT-A cell and the log obtained in the RAT-A cell are overwritten (or discarded). Further, when the UE in the RRC_Idle state (in the idle mode) moves between different RAT cells such as between LTE cell and UMTS cell (that is, performs cell reselection between different RAT cells: Inter-RAT Cell Reselection), in so far as the location registration areas are not changed from those registered before in the LTE cell and the UMTS cell, if the ISR (Idle mode Signaling Reduction (Non Patent Literature 3)) that is able to omit the location registration process is applied, it is impossible to obtain measurement information by the Logged MDT from immediately after the UE moved to the RAT-B cell.

For example, when the UE in the RRC_Idle state (in the idle mode) moves from the RAT-A to the RAT-B, the obtainment (acquisition) of measurement information in the RAT-B is interrupted. Here, if it is under a situation where the ISR is applicable and if it is not necessary to change the location registration area when the UE moves from the RAT-A to the RAT-B, the UE does not go to the RRC_Connected state (to the active mode). When the location registration process is omitted by the ISR, the UE would not receive new configuration information to be notified through the location registration process. As a result, the UE was left to the situation in which the obtainment of the measurement information was interrupted. This did not allow the UE to continuously obtain the measurement information in the RAT-B. As described above, in the Logged MDT, when reselecting the cell between the different RAT cells, the UE cannot continuously obtain the measurement information even after the cell reselection. In the Drive-Test, information available at a point where the UE moves between different RATs (e.g., information on received quality) is important measurement information for the cell coverage optimization by taking into account the different RAT or the like. Hence, in the Logged MDT, it shall be necessary for the LTE to be capable of continuously obtaining the measurement information when the LTE performs the cell reselection between the cells of different RATs.

Therefore, the problem to be solved by the present invention is to realize the continuous obtainment (acquisition) of the measurement information while the radio terminal moves between the cells of different RATs Solution to Problem The present invention is a radio communication system in which a radio terminal obtains measurement information designated by a network in an idle state and reports the obtained measurement information in an active state, the radio communication system comprising: a radio station configured to operate a first cell of a first Radio Access Technology, wherein, in the first cell, the radio station comprises; a notifying means configured to notify the radio terminal of first configuration information related to obtainment of the measurement information in the first cell; and a request means configured to request the radio terminal to obtain, after the radio terminal moves to a second cell of a second Radio Access Technology different from the first Radio Access Technology, the measurement information in the second cell.

The present invention is a radio terminal obtaining measurement information designated by a network in an idle state and reporting the obtained measurement information in an active state, the radio terminal comprising: a receiving means configured to receive from a radio station operating a first cell of a first Radio Access Technology first configuration information related to obtainment of the measurement information in the first cell and to receive a request for obtaining the measurement information, after the radio terminal moves to a second cell of a second Radio Access Technology different from the first Radio Access Technology, from the radio station; and a measurement information obtaining means configured to obtain the measurement information based on the request.

The present invention is A radio station in a radio communication system, in which a radio terminal obtains measurement information designated by a network in an idle state and reports the obtained measurement information in an active state: wherein the radio station configured to operate a first cell of a first Radio Access Technology comprises; a notifying means configured to notify the radio terminal staying in the first cell of first configuration information related to obtainment of the measurement information in the first cell; and a request means configured to request the radio terminal staying in the first cell such that the radio terminal obtains, after moving to a second cell of a second Radio Access Technology different from the first Radio Access Technology, the measurement information in the second cell.

The present invention is a network apparatus causing a radio terminal to obtain measurement information in an idle state and causing the radio terminal to report the obtained measurement information in an active state, the network apparatus comprising: a notifying means configured to notify first configuration information related to obtainment of the measurement information in the first cell by the radio terminal, to a radio station operating a first cell of a first Radio Access Technology where the radio terminal stays; and an instruction means configured to instruct the radio station to make the radio terminal to obtain, after the radio terminal moves to a second cell of a second Radio Access Technology different from the first Radio Access Technology, the measurement information in the second cell.

The present invention is an information collection method in which a radio terminal obtains measurement information designated by a network in an idle state and reports the obtained measurement information in an active state, the information collection method comprising: notifying the radio terminal staying in a first cell of a first Radio Access Technology of first configuration information related to obtainment of the measurement information in the first cell; and requiring the radio terminal staying in the first cell to obtain, after the radio terminal moves to a second cell of a second Radio Access Technology different from the first Radio Access Technology, the measurement information in the second cell.

The present invention is an information collection method in which radio terminal obtains measurement information designated by a network in an idle state and reports the obtained measurement information in an active state, the information collection method comprising: receiving from a radio station operating a first cell of a first Radio Access Technology first configuration information related to obtainment of the measurement information in the first cell; receiving a request from the radio station to obtain, after the radio terminal moves to a second cell of a second Radio Access Technology different from the first Radio Access Technology, the measurement information; and obtaining the measurement information based on the request.

Advantageous Effect of Invention

According to the present invention, it is possible to realize the continuous obtainment (acquisition) of measurement information even while a cell reselection between different RAT cells is performed.

BRIEF DESCRIPTION OF DRAWINGS

FIG. 9 is an exemplary format for reporting in an LTE cell.

DESCRIPTION OF EMBODIMENTS

Principle of Invention

Figure 1:
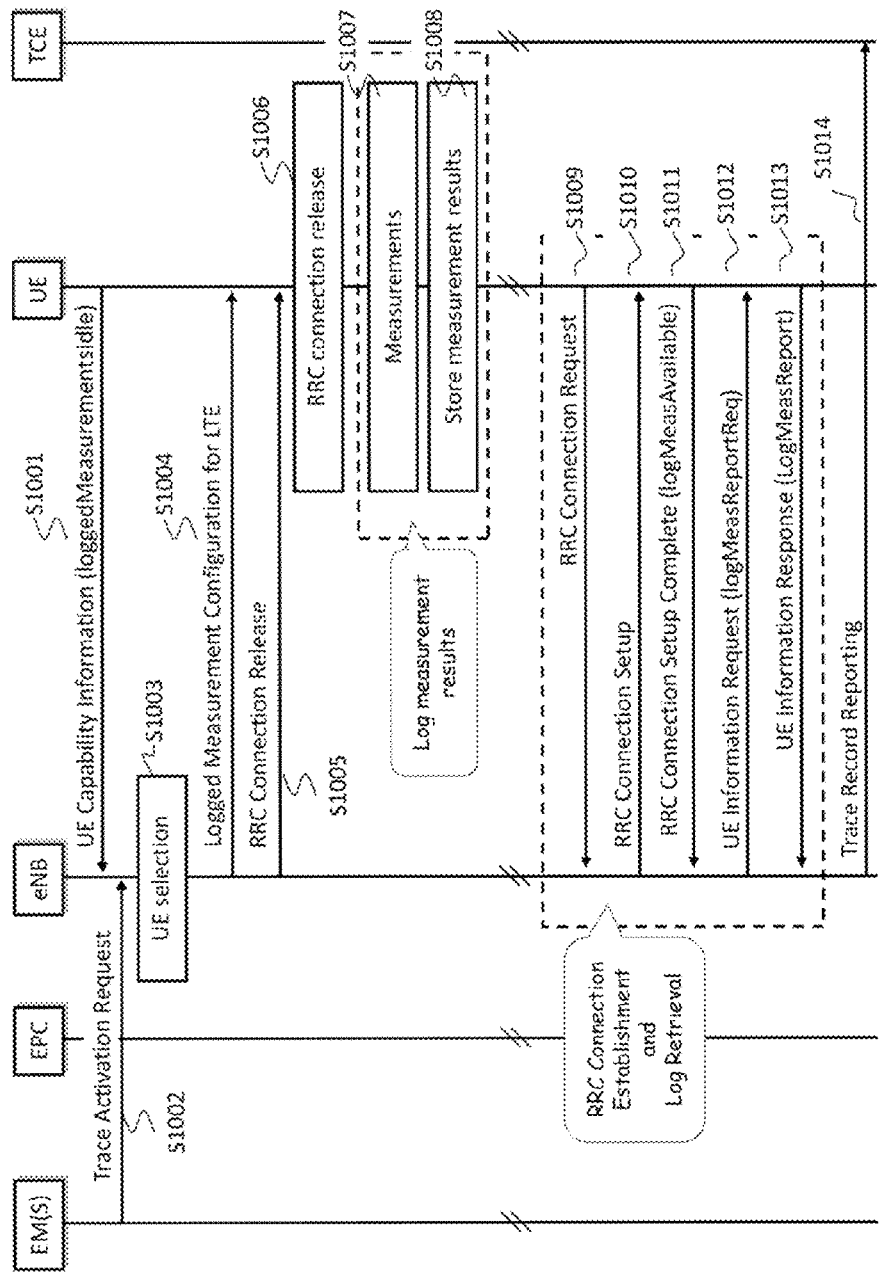
FIG. 1 is a sequence diagram of operations of a radio network and a radio terminal of Logged MDT according to the present invention.
Figure 2:
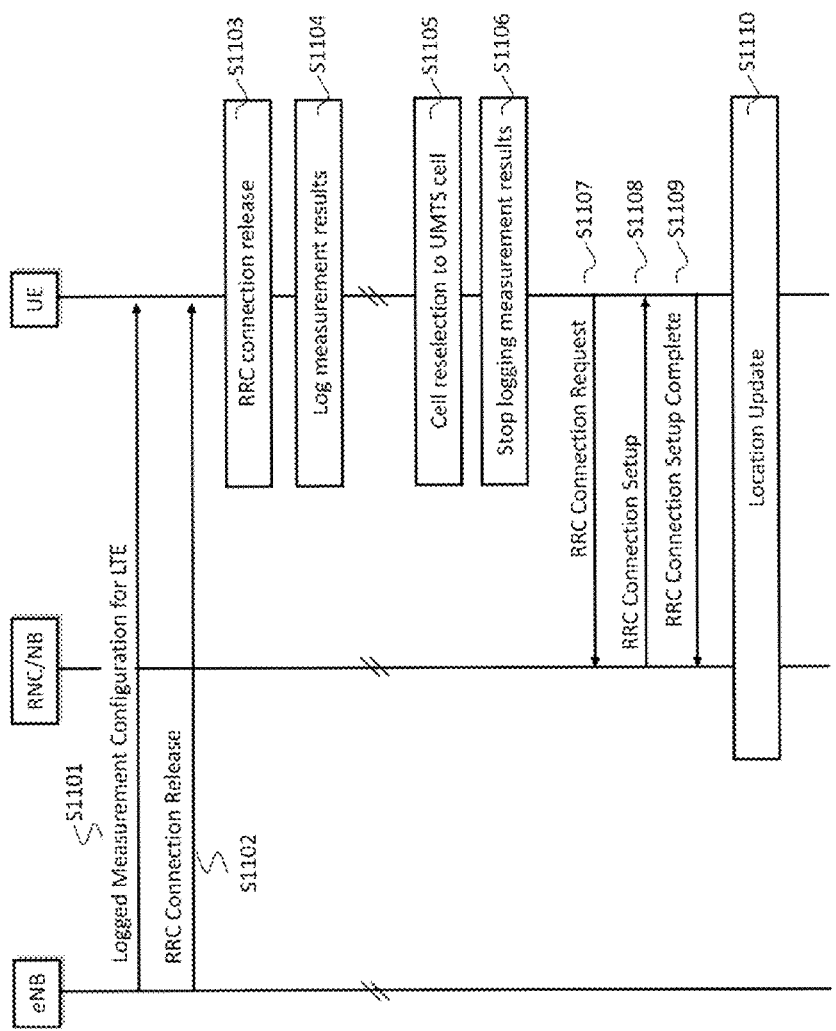
FIG. 2 is another sequence diagram of operations of the radio network and the radio terminal of the Logged MDT according to the present invention.

According to the principle of the present invention, a radio station managing a first cell of a first Radio Access Technology (RAT) notifies, in the first cell, a radio terminal of first configuration information related to obtainment (acquisition) (that is, measurement and recording of the measurement results) of measurement information in the first cell in the idle state (also referred to as idle mode, non communication state, or non-connection state) (first measurement information) and further requests the radio terminal to obtain, after the radio terminal moves to a second cell of a second Radio Access Technology, measurement information in the second cell in the idle state (second measurement information). For the sake of easy understanding of the present invention, the radio station is referred to as first radio station throughout the following description.

If the radio terminal having received the request above mentioned moves from the first cell to the second cell, the radio terminal obtains the second measurement information in the second cell in the idle state. Further, after moving from the second cell to the first cell again, the radio terminal may obtain again the first measurement information in the first cell in the idle state.

The obtainment of the second measurement information in the second cell by the radio terminal may be autonomously started by the radio terminal. Alternatively, this obtainment may be started from when the radio terminal receives a predetermined signal (or information) from a second radio station. In the latter case, it is possible to start this obtainment, for example, based on the broadcast information, from when the radio terminal detects that the radio terminal itself is allowed to stay in the second cell or from when the radio terminal detects that the second cell is a target cell where the radio terminal obtains the measurement information.

Similarly, the obtainment of the first measurement information in the first cell by the radio terminal after the radio terminal moves from the second cell to the first cell again may be autonomously started by the radio terminal. Alternatively, this obtainment may be started from when the radio terminal receives a predetermined signal (or predetermined information) from the first radio station.

Also, the "move" means here, regardless of whether the radio terminal itself physically moves, the radio terminal changes its staying cell from the first (or the second) cell to the second (or the first) cell. Further, information elements (that is, measurement items) contained in the first measurement information may be identical to those of the second measurement information. Alternatively, the measurement items may be partially or completely different from each other.

Reporting of the measurement information is performed by the radio terminal in the active state (also referred to as active mode, communication state, or connection state). In the present invention, the first measurement information and the second measurement information obtained, respectively, in the first cell and the second cell may be reported in the second cell. Alternatively, the measurement information may be reported in the same sort of the cell where the measurement information was obtained. Further alternatively, the first and second measurement information may be reported in the first cell where the radio terminal received the instruction to obtain the measurement information.

For example, the following items are conceived as an item of measurement information.

Received power of a known signal in staying cells or neighboring cells;
  Received quality of a known signal in staying cells or neighboring cells;
  Receiving failure information of a common control signal;
  Transmission failure information of an access signal;
  Radio link failure information; and
  Location information A staying cell is also called a serving cell or a camping cell, and a known signal is also called a pilot signal or a reference signal. As received quality, there is a ratio of signal power to interference signal power (Signal power to Interference power Ratio: SIR) for a desired wave (desired signal), or a ratio of signal power to interference and noise power (Signal power to Interference and Noise power Ratio: SINR) or the like, but the present invention is not limited to thereto.

Receiving failure information of a common control signal relates to system information to be broadcasted or information related to receiving failure of paging information, and failure information of an access signal corresponds to information that the radio terminal fails to transmit a random access signal or the like used for establishing a radio link with the radio station. Radio link failure information relates to the information that a radio link established between the radio terminal and the radio station is unintentionally disconnected (that is, being in a state that a radio link is not maintained), and this state is generally called RLF (Radio Link Failure).

Further, location information relates to the information on an area where the radio terminal stays, the information stored by the radio terminal at the time of logging the measurement information, and for example, location information obtained by GNSS (Global Navigation Satellite System) typified by GPS, or location information computed by an OTDOA (Observation Time Difference Of Arrival) method which identify the location by using a time difference of receiving a signal from a plurality of base stations such as a radio base station, is conceived.

Examples of the configuration information are as listed below.

Absolute time as a reference time which starts recording of the measurement information;
  Recording duration of the measurement information;
  Recording interval of the measurement information;
  Recording target area of the measurement information; and
  Trace related information Measurement item information is information indicating items of the above measurement information. The recording duration and the recording interval are, respectively, the duration to record the measurement results and the interval to record the measurement results.

The request by the first radio station to obtain the measurement information after the radio terminal moves from the first cell to the second cell can be made, for example, by the following three methods.

Method for requesting only obtainment of the measurement information in the second cell;
  Method for requesting in the second cell a report on the measurement information obtained in the first cell, and obtainment of and a report on the measurement information; and Method for requesting obtainment of the measurement information in the second cell and a report on the measurement information obtained in the second cell The requesting method can be performed, for example, by the following two means.

a) Notifying only information a flag) to instruct obtainment of the measurement information in the second cell by any one of the above methods; and b) Notifying the second configuration information in the second cell The second configuration information may be notified in association with the first configuration information in the first cell.

Also, the second configuration information may include items (or information) similar to those of the first configuration information or may contain only a part of the items (or information) of the first configuration information. If there is no second configuration information or if the second configuration information contains less amount of information comparing to the first configuration information (e.g., if the second configuration information contains only a part of the information of the first configuration information), the radio terminal reuses a part of the information of the first configuration information corresponding to the shortage of the information of the second configuration information (e.g., missing items in comparison with the first configuration information part). Herein, it is conceived that reuse refers to the processes such as:

Taking over (or, using) configured values or the like as they are;

Continuing values such as a timer and a counter; and

Reading (or translating) measurement item information or the like of the first RAT to those of the second RAT, but the present invention is not limited to these processes.

Further, in the case when the radio terminal stores in advance (or, defined in the specification) some of information related to obtainment of measurement information, for example, an item of measurement information as a target (that is, a measurement item), it is conceived to change such information to the corresponding RAT one when changing Radio Access Technology (RAT).

By executing the present invention described above, the radio terminal is able to report measurement information even when moving between the cells of different radio access technologies (RATs), and collecting the measurement information in the radio station or in the upper network (or network apparatus) that manages the radio station. As a result, it is possible to grasp a radio wave environment at a point and its adjacent area where the radio terminal moves between the cells of different RATs (e.g., received power and received quality of each RAT cell and a relationship such as a degree of overlapping the cells of different RATs). This can realize coverage optimization and mobility optimization by taking into account the cells of a plurality of RATs.

In the above description, the first radio station is described distinctively from the second radio station. It is also possible to employ a radio station having functions of both of the first Radio Access Technology (RAT) and the second Radio Access Technology (RAT).

Further, it is also conceived that a notification of configuration information related to obtainment of measurement information performed from the radio station to the radio terminal (that is, instruction to obtain measurement information) is executed by giving an instruction from an upper network apparatus or an upper network management apparatus, which manages the radio station, to the radio station.

For example, more specifically, it is conceived that the network management apparatus notifies the radio station of configuration information either through the network apparatus, or directly.

Hereinafter, embodiments of the present invention will be described.

First Embodiment

A first embodiment of the present invention will be described below with reference to FIG. 3 through FIG. 5.

Figure 3:
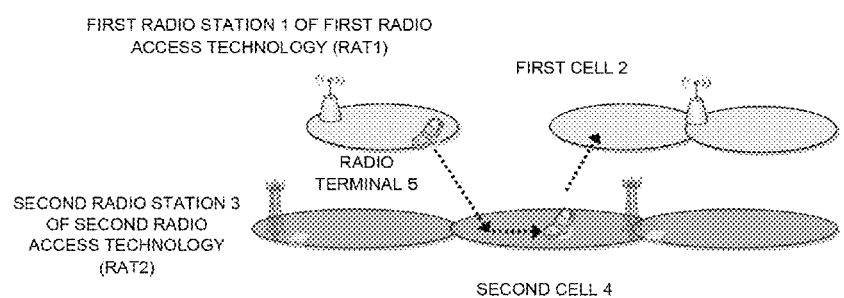
FIG. 3 is a configuration diagram of a radio communication system according to a first embodiment of the present invention.

FIG. 3 is a diagram illustrating a radio communication system in accordance with a first embodiment of the present invention. The radio communication system in the first embodiment includes a first radio station 1 having a function of the first Radio Access Technology (RAT1), a first cell 2 provided by the first radio station, a second radio station 3 having a function of the second Radio Access Technology (RAT2), a second cell 4 provided by the second radio station, and a terminal 5 having the functions of both RAT1 and RAT2. Herein, in the following descriptions, the first radio station 1 is differentiated from the second radio station 3, but the first radio station 1 or the second radio station 3 may have the functions of both RAT1 and RAT2. Further, alternatively, a single radio station may take a roll of both of the first radio station 1 and the second radio station 3.

Figure 4:
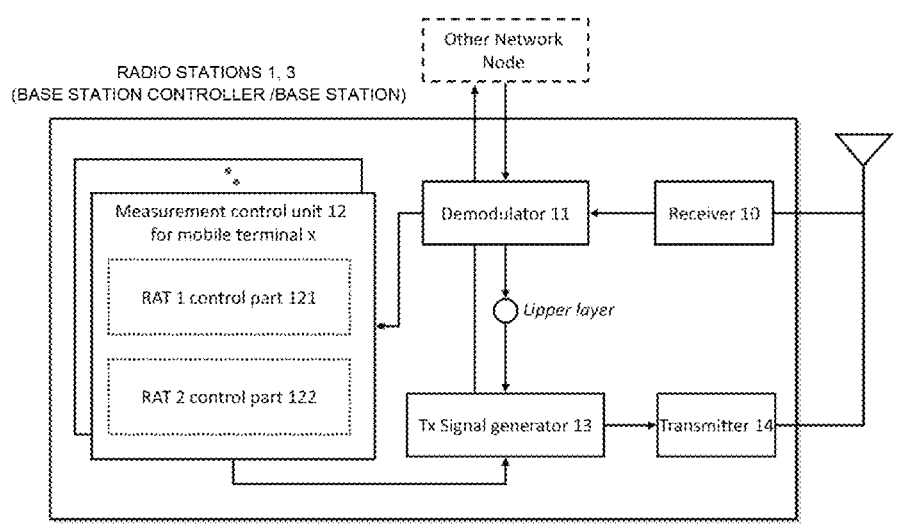
FIG. 4 is a block diagram of a radio station of the present invention.
Figure 5:
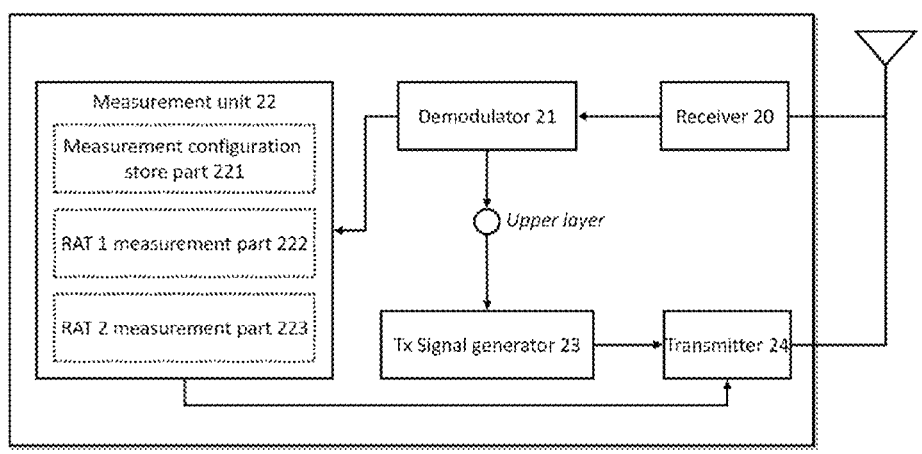
FIG. 5 is a block diagram of the radio terminal of the present invention.

Functional block diagrams of the radio stations 1 and 3 and the radio terminal 5 are, respectively, shown in FIG. 4 and FIG. 5.

In FIG. 4, the radio stations 1 and 3 include a receiver 10 that receives a radio signal from the radio terminal 5, a demodulator 11 that demodulates a signal received from the radio terminal 5 or other network nodes, a measurement control unit 12 that gives an instruction to measure quality of the received signal or the like per radio terminal, a signal generator (Tx signal generator) 13 that generates signals for a radio terminal or other networks, and a transmitter 14 that transmits a radio signal to the radio terminal 5.

The measurement control unit 12 is further divided to a part 121 for measurement control in RAT1 (RAT1 control part), and a part 122 for measurement control in RAT2 (RAT2 control part). Examples of the radio station include a radio base station and a base station controller managing the radio base station.

In FIG. 5, the radio terminal 5 includes a receiver 20 that receives a radio signal from the radio stations 1 and 3, a demodulator 21 that demodulates the received signal, a measurement unit 22 that measures quality of the received signal or the like, signal generator (Tx signal generator) 23 that generates signals for the radio stations 1 and 3, and a transmitter 24 that transmits a radio signal to the radio stations 1 and 3. The measurement unit 22 is further divided to a part 221 for storing control information related to measurement (Measurement configuration store part), and a part 222 for measuring in RAT 1 (RAT1 measurement part) and a part 223 for measuring in RAT 2 (RAT2 measurement part). The configuration of function blocks in FIG. 4 and FIG. 5 is one of the examples, and the present invention is not limited to be applied to such configurations.

A specific example 1 according to the first embodiment will be described below.

Example 1

Figure 6:
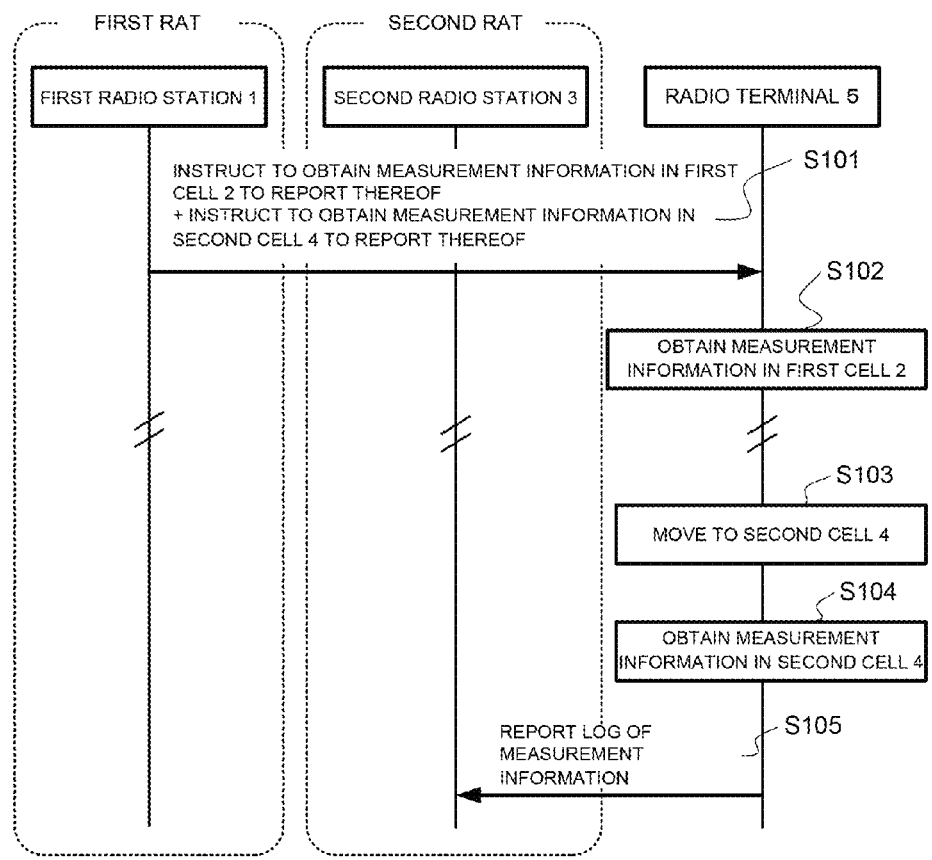
FIG. 6 is a sequence diagram of operations of a radio station and a radio terminal of a first example of the present invention.

A first example of the present invention will be described below. FIG. 6 is a sequence diagram of operations of the radio stations and the radio terminal in the first example. In the first example, the first radio station 1 instructs the radio terminal 5 to obtain the measurement information (that is, measurement and recording of the measurement results) in the first cell 2 to report it and further instructs the radio terminal 5 to obtain the measurement information in the second cell 4 to report it.

Step S101: The first radio station 1 instructs the radio terminal 5 to obtain the measurement information in the first cell 2 to report it. Also, the first radio station 1 instructs the radio terminal 5 to obtain the measurement information in the second cell 4 to report it. At this time, the first radio station 1 notifies at least the first configuration information to the radio terminal 5.

Step S102: The radio terminal 5 obtains the measurement information in the first cell 2 (that is, the first measurement information).

Step S103: The radio terminal 5 moves to the second cell 4. The "move" here means a change of the cell where the radio terminal 5 stays, e.g., a change from the first cell 2 to the second cell 4, regardless of whether the radio terminal 5 itself physically moves. At this time, if the radio terminal 5 has not received the second configuration information in advance or if the second configuration information received by the radio terminal 5 is partial comparing to the first configuration information (that is, the second configuration information contains insufficient information), the radio terminal 5 executes processing to reuse the first configuration information.

Step S104: The radio terminal 5 obtains the measurement information in the second cell 4 (that is, the second measurement information).

Step S105: The radio terminal 5 reports a log of the first measurement information and a log of the second measurement information to the second radio station 3 in the second cell 4. Here, the radio terminal 5 may perform the report such that the log of the first measurement information can be differentiated from the log of the second measurement information. The differentiation can be performed by adding information indicating the corresponding Radio Access Technology (RAT) to the top of each log of the first and second measurement information, adding information indicating the first RAT to the end of the log of the first measurement information, or adding information indicating the second RAT to the top of the log of the second measurement information. The addition of information for differentiating from these RATs each other may be performed concurrently with obtainment (acquisition) of the measurement information.

The foregoing steps allow to realize continual obtainment of measurement information even when the radio terminal moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration.

Example 2

A second exemplary example of the present invention will be described below.

Figure 7:
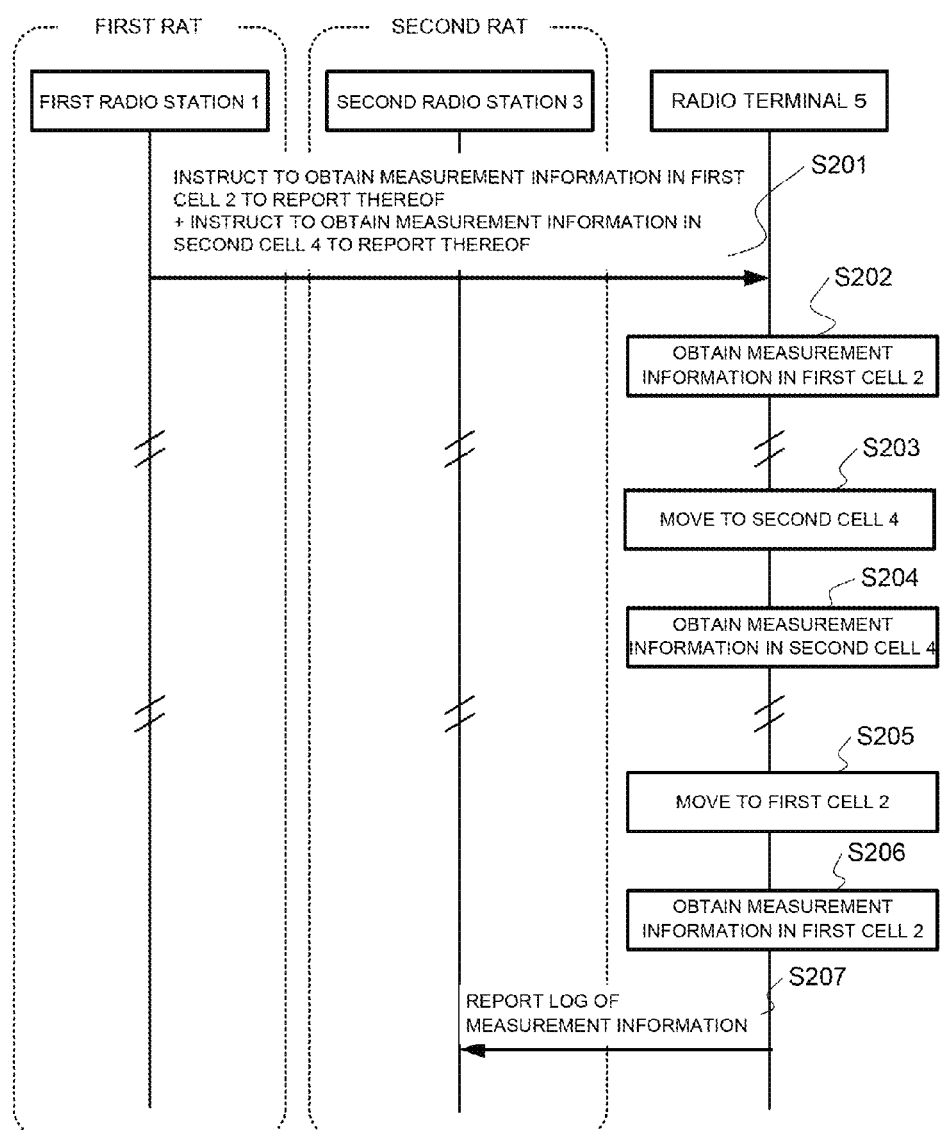
FIG. 7 is a sequence diagram of operations of a radio station and a radio terminal of a second example of the present invention.

FIG. 7 is a sequence diagram of operations of the radio stations and the radio terminal in the second example. In the second example, the first radio station 1 instructs the radio terminal 5 to obtain the measurement information in the first cell 2 (that is, the measurement and recording of the measurement results) to report it, and further instructs the radio terminal 5 to obtain the measurement information in the second cell 4. That is, the radio terminal 5 does not perform the reporting of the measurement information in the second cell 4.

Step S201: The first radio station 1 instructs the radio terminal 5 to obtain the measurement information in the first cell 2 to report it. Also, the first radio station 1 further instructs the radio terminal 5 to obtain the measurement information in the second cell 4. At this time, the first radio station 1 notifies at least the first configuration information to the radio terminal 5.

Step S202: The radio terminal 5 obtains the measurement information in the first cell 2 (that is, the first measurement information).

Step S203: The radio terminal 5 moves to the second cell 4. The "move" here means that the radio terminal changes its staying cell from the first cell 2 to the second cell 4 regardless of whether the radio terminal itself physically moves. At this time, if the radio terminal 5 has not received the second configuration information in advance or if the second configuration information contains only a partial of information comparing to the first configuration information (that is, information is not sufficient), the radio terminal 5 executes processing to reuse the first configuration information.

Step S204: The radio terminal 5 obtains the measurement information in the second cell 4 (that is, the second measurement information). Here, at step S201, since the radio terminal 5 has not received instruction to report the measurement information in the second cell 4, even if the radio terminal goes to the active state in the second cell 4, the radio terminal does not perform a report of the obtained measurement information.

Step S205: The radio terminal 5 moves to the first cell 2 again.

Step S206: The radio terminal 5 obtains the first measurement information again in the first cell 2.

Step S207: The radio terminal 5 reports the log of the first measurement information and the log of the second measurement information to the first radio station 1 in the first cell 2. Here, the radio terminal 5 may perform, as similar to the first example, a report such that the log of the first measurement information can be differentiated from the log of the second measurement information.

The foregoing steps allow to realize continual obtainment (acquisition) of measurement information even when the radio terminal moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration.

Second Embodiment

Figure 8:
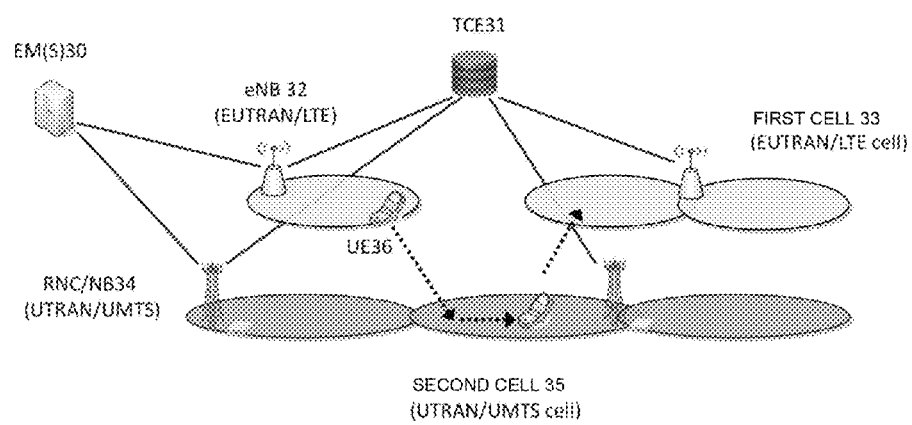
FIG. 8 is a configuration diagram of a radio communication system according to a second embodiment of the present invention.

A second embodiment will be described below with reference to FIG. 8. Here, the 3 GPP LTE (Long Term Evolution) system and the UMTS (Universal Mobile Telecommunication System) system are supposed to be employed.

The radio communication system in the second embodiment includes a network operation management system (Element Manager: EM. It is also called Element Management System: EMS) 30, a trace information collection apparatus (Trace Collection Entity: TCE), a first radio base station 1 (evolved Node B: eNB) having a function of LTE of the first Radio Access Technology (RAT), a first cell (LTE cell) 33 provided by the first radio base station eNB, a second base station control station (Radio Network Controller: RNC)/radio base station (Node B: NB) 34 having a function of UMTS of the second Radio Access Technology, a second cell (UMTS cell) 35 provided by the second base station control station RNC/radio base station NB34, and a radio terminal (User Equipment: UE) 36 having both the functions of LTE and UMTS.

Note that the base station control station RNC and the base station NB have different nodes in reality, and the both RNC and NB are connected with each other by way of a predetermined interface, but the both are collectively described for the sake of simplicity. Although not shown in the figure, a LTE radio network is configured with a packet core network (Evolved Packet Core: EPC) including a network apparatus, such as a mobile management apparatus (Mobility Management Entity: MME) of the radio terminal UE and a serving gateway (Serving Gateway: S-GW). Similarly, a UTMS radio network is configured with a core network (Core Network: CN) including a network apparatus, such as a serving GPRS (General Packet Radio Service) support node (Serving GPRS Support Node: SGSN) and a mobile (communication) switching station (Mobile Switching Centre: MSC).

In addition, a home subscribe management server (Home Subscriber Server: HSS) is provided as a network apparatus that is common between multiple RATs. Further, the present invention may be of course applied to the case when the first RAT is UMTS and the second RAT is LTE. In the following description, the radio base station eNB is distinctively described from the base station control station RNC/radio base station NB. It is also possible that a certain radio station has functions of both of the radio base station eNB and the base station control RNC/radio base station NB. Further, a single radio station may serve as the radio base station eNB and the base station control station RNC/radio base station NB.

Further, a logged MDT that is one of drive-test minimization functions (Minimization of Drive Test: MDT) defined in 3GPP LTE and UMTS is assumed as a function of obtaining and reporting measurement information by the radio terminal UE36. In the Logged MDT, the radio terminal UE obtains measurement information (measurement, and logging of the measurement results) in any of a RRC (Radio Resource Control)_Idle state of LTE, a UMTS_Idle state of UMTS, a CELL_PCH (Paging CHannel) state and a URA (UTRAN Registration Area)_PCH state in accordance with configuration information (Logged Measurement Configuration) notified from a radio station (e.g. radio base station eNB of LTE or base station control station RNC/base station NB of UMTS). Herein, a thing in which what the measurement results are recorded is called a log. The log includes information that indicates logging time (or timing), etc.

On the other hand, for example, the followings are conceived as an item of measurement information in the Logged MDT. In the case of LTE, Received power (RS Received Power: RSRP) of a reference signal (Reference Signal: RS) of serving cells and neighboring cells;

Received quality (RS Received Quality: RSRQ) of a reference signal (RS) of serving cells and neighboring cells;

Reception failure information (Paging Channel Failure, Broadcast Channel Failure) of a common control signal (channel);

Transmission failure information of a random access signal (Random Access Failure);

Radio link failure RLF (Radio Link Failure) information; and

Location Information.

Herein, location information includes detailed information obtained with GNSS typified by GPS, and detailed location information obtained with a network based location information obtainment (acquisition) service (Location Service: LCS) such as OTDOA. Physical cell IDs (Physical Cell Identity: PCI) in multiple neighboring cells on the same frequency, and received power (RSRP) of a reference signal of the neighboring cells are logged as location information, when failing to obtain (when not storing) the detailed location information. This is also called RF (Radio Frequency) fingerprint.

Similarly, in the case of LTE,

Received power (Received Signal Code Power: RSCP) of a pilot signal (Common Pilot Channel: CPICH) in serving cells and neighboring cells;

Received quality (Ratio of energy per modulating bit to the noise spectral density: Ec/No) of a pilot signal (CPICH) in serving cells and neighboring cells;

Reception failure information of a common control signal (channel) (Paging Channel Failure, Broadcast Channel Failure);

Transmission failure information of a random access signal (Random Access Failure);

Radio link failure RLF (Radio Link Failure) information; and

Location Information.

Herein, location information includes detailed information obtained with GNSS or LCS, which is the same as in LTE. Physical cell IDs (Primary Synchronization Code: PSC) in multiple neighboring cells having the same frequency, and received power (RSCP) of a pilot signal in the neighboring cells are logged as location information, when failing to obtain (when not storing) the detailed location information.

Examples of the configuration information of the Logged MDT (Logged Measurement Configuration) include as follows.

Absolute time (Absolute Time Info) as a reference time which starts recording of the measurement information (e.g., measurement results);

Recording duration (Logging Duration) of the measurement information (e.g., measurement results);

Recording interval (Logging Interval) of the measurement information (e.g., measurement results);

Target area for logging measurement information (Area Configuration) (e.g. measurement results); and Trace related information (Trace Information)

Herein, a logging target area is indicated by a global cell ID (EUTRAN Cell Global Identity: ECGI) or a tracking area (Tracking Area: TA) in the case of LTE, and by a global cell IT) (Cell Global Identity: CGI), a routing area (Routing Area: RA), or a location area (Location Area: LA) in the case of UMTS. When the logging target area (Area Configuration) is not included in the configuration information, logging is performed while staying in a public land mobile network (Public Land Mobile Network: PLMN) at the time of receiving the configuration information. In addition, logging may be performed while staying in any PLMN equivalent to the above-mentioned PLMN (equivalent PLMN: ePLMN).

Also, the trace related information is the information for managing on the network side the execution of the MDT in which the radio terminal UE obtains and reports measurement information, and in the Logged MDT, it is reported to the radio network together when the radio terminal UE reports a log. More specifically, the trace related information includes a predetermined identifier (Trace Reference ID) for identifying when the radio network instructs the MDT and by which the radio terminal UE, or information on the TCE collecting a log reported from the radio terminal UE (TCE IP Address or TCE ID), or the like.

Examples of such a request (or an instruction) by the first RAT (LTE) radio base station eNB32 for causing the radio terminal UE36 to continue the obtainment (acquisition) of the measurement information (that is, measurement and recording of the measurement results) after the radio terminal moves to the second RAT (UMTS) cell 35 (e.g., Cell Reselection and Handover) include the following three methods.

Method for requesting obtainment of the measurement information in the second RAT cell (that is, log generation);

Method for requesting obtainment of the measurement information in the second RAT cell (that is, log generation) and the report on the logs obtained in the first and second RAT cells; and Method for requesting obtainment of the measurement information in the second RAT cell (that is, log generation) and the report on the log obtained in the second RAT cell Also, examples of the method for making the request include the following two means.

a) Means for notifying information (e.g., flag) to request execution of either one of the above methods in the second RAT cell; and b) Means for notifying a message containing the configuration information of the Logged MDT in the second RAT cell Here, the radio base station eNB32 of the first RAT (LTE) may notify the configuration information of the Logged MDT in the second RAT cell in association with the configuration information of the Logged MDT in the first RAT cell. The means b) can be realized with ease by setting a specification in advance such that, when receiving the message, the radio terminal UE36 can identify which of the above three methods is instructed to execute, or the radio terminal UE36 shares in advance the configuration information between the radio network side and the radio terminal side. Alternatively, for example, it is also possible to employ a combination of the methods a) and b).

Further, the configuration information of the Logged MDT in the second RAT cell (that is, second configuration information) may contain items (or information) identical to those of the configuration information of the Logged MDT in the first RAT cell (that is, first configuration information), or may contain only a part corresponding to the items (or information) contained in the first configuration information. If there is no second configuration information or the second configuration information contains insufficient amount of information comparing to that of the first configuration information (e.g., if the second configuration information contains only partial information of the first configuration information), the radio terminal re-uses the information contained in the first configuration information with respect to the insufficient part of the second configuration information (e.g., a part insufficient in the information comparing to the first configuration information). Here, it is supposed, but not limited thereto, the "re-use" means processing as described below.

Taking over (or using), for example, the absolute time, the Logging Duration, the Logging interval, and the trace-related information as they are; and Continuing values of, for example, the timer or the counter for measuring the Logging Duration, the Logging interval, and other items In the Logged MDT of 3GPP, items of measurement information (that is, measurement items) as a target are defined in the specification per a RAT basis (LTE is RSRP and RSRQ, UMTS is RSCP and Ec/No). Then, the radio terminal UE also changes items of the measurement information (that is, measurement items) when changing RAT by moving between the cells of different RATs (e.g. cell reselection or handover).

Here, start of the Logged MDT after the radio terminal moved to the different RAT cell (that is, start of the log obtainment) may be made after the radio terminal identifies (or detects) that the cell to which the radio terminal moved is the target area of the Logged MDT or may be made before the identification (or the detection) thereof. Determination whether the area is the target area of the Logged MDT may be made by such a method that the radio terminal receives system information (System Information) broadcasted in the cell to which the radio terminal moved and determines whether the cell is the target PLMN of the Logged MDT. Similarly, the determination may be made by the global cell ID or TA in the case of the LIE and by the global cell ID or RA or LA in the case of the UMTS.

When obtaining the logs in the different RAT cells, the radio terminal UE36 may perform a report in such a manner that the report can differentiate the log in the first RAT cell from the log in the second RAT cell. Supposed examples include the following methods.

Method in which, when the radio terminal obtains a log in each RAT in the series of execution of the Logged MDT instructed from a radio network at certain timing, information (e.g., a flag or an identifier) indicating the RAT is added to the log (e.g., the first log obtained in each RAT is added with information indicating the RAT);

Method in which, when the radio terminal moves to another RAT from the RAT where the radio terminal received the instruction to execute the Logged MDT and obtains the first log in the RAT to which the radio terminal has moved, information indicating the RAT is added to the first log (the method being repeated in each time the RAT is changed);

Method in which a different information element (Information Element) is set to each RAT (FIG. 9 illustrates an example of a format of a report in the case of the LTE cell); and Method in which an independent memory is prepared for each RAT, and information indicating the RAT is added in the log stored in each memory In the case of adding the information indicating the RAT, the addition may be performed at the time of reporting instead of at the time of obtaining the log.

Further example of the present invention will be described below based on the above second embodiment.

Example 3

A third example of the present invention will be described below.

Figure 10:
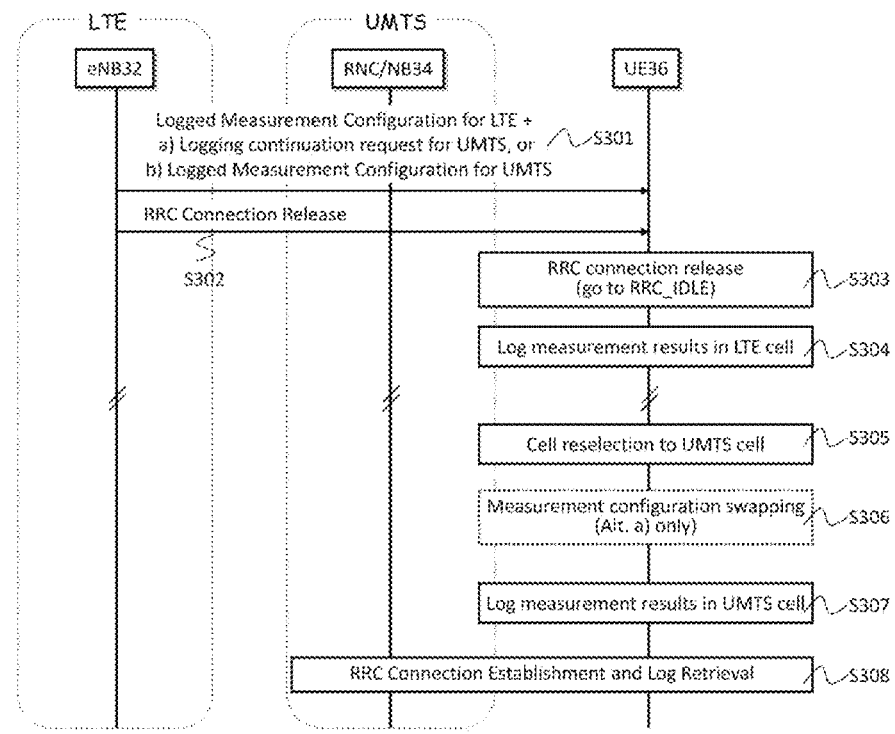
FIG. 10 is a sequence diagram of operations of a radio station and a radio terminal of a third example of the present invention.

FIG. 10 is a sequence diagram of operations of the radio station and the radio terminal in the third example. In FIG. 10, the LTE radio base station eNB32 is supposed as the first radio station of the first Radio Access Technology (RAT), and the UNITS base station control station/base station NB 34 is supposed as the second radio station of the second Radio Access Technology (RAT). Also, it is provided that the radio terminal UE36 stays in the LTE cell 33 in the RRC_Connected state (that is, The radio terminal UE36 belongs to the radio base station eNB that manages the cell).

In the third example, the LTE radio base station eNB32 instructs the radio terminal UE36 to execute the Logged MDT in the LTE cell 33 and the UMTS cell 35, that is, instructs the radio terminal UE36 to obtain the measurement information (that is, measurement and recording of the measurement results) to report it. Here, such a case is supposed that, when the radio terminal UE36 in the RRC_Idle state reselects the cell between the different RAT cells, that is, between the LTE cell and the UMTS cell (Inter-RAT Cell Reselection), in so far as there is no change in location registration area registered before in the LTE and the UMTS, an ISR (Idle Mode Signaling Reduction) that is able to omit a location registration procedure is applied.

Step S301: The radio base station eNB32 instructs the radio terminal UE36 to transmit the Logged MDT configuration information as the first configuration information corresponding to the instruction of the execution of the Logged MDT in the LTE cell 33 (Logged Measurement Configuration for LTE) and further instructs the radio terminal UE36 to execute the Logged MDT in the UMTS cell 35. The instruction of the execution of the Logged MDT in the UMTS cell 35 is performed by either one of a) transmission of a request for continuing the Logged MDT in the UMTS cell 35 (Logging continuation request for UMTS) or b) transmission of the Logged MDT configuration information as the second configuration information necessary for the execution of the Logged MDT in the UNITS cell 35 (Logged Measurement Configuration for UMTS).

Step S302: The radio base station eNB32 instructs the radio terminal UE36 to go to the idle state (RRC_Idle) at predetermined timing (RRC Connection Release).

Step S303: The radio terminal UE36 releases the RRC connection and goes to the idle state (RRC connection release (go to RRC_IDLE)).

Step S304: The radio terminal UE36 obtains the measurement information in the LTE cell 33 (Log measurement results in LTE cell).

Step S305: When receiving a predetermined cell reselection trigger, the radio terminal UE36 reselects the cell from the LTE cell 33 to the UMTS cell 35 (Cell reselection to UMTS cell).

Step S306: When the radio terminal UE36 is notified of only the first configuration information (that is, in the case of the option a)), the radio terminal UE36 performs taking over the first configuration information and continuation of processing based on the first configuration information (e.g., continuation of measurement by means of a timer or a counter) (Measurement configuration swapping).

Step S307: The radio terminal UE36 switches the items of the measurement information (that is, measurement items) from the items of the LTE (RSRP and RSRQ) to the items of the UMTS (RSCP and Ec/No) and further obtains the measurement information (Log measurement results in UMTS cell).

Step S308: When a predetermined trigger for the RRC connection establishment is happened, the radio terminal UE36 establishes RRC connection with the base station control station RNC/base station NB34 to report the log currently stores (RRC Connection Establishment and Log Retrieval). At this time, the radio terminal UE36 reports additionally information for differentiating the log obtained in the LTE cell 33 from the log obtained in the UMTS cell 35.

By following the above steps, even when the radio terminal UE performs the cell reselection to move between the cells of different Radio Access Technologies (RATs), the radio terminal UE is able to realize the continuous obtainment (acquisition) of the measurement information. As a result, it is possible to grasp the radio wave environment at a point and its adjacent area where the radio terminal moves between the cells of different RATs. This enables to realize coverage optimization and mobility optimization by taking into account the cell of plurality of RATs.

Figure 11:
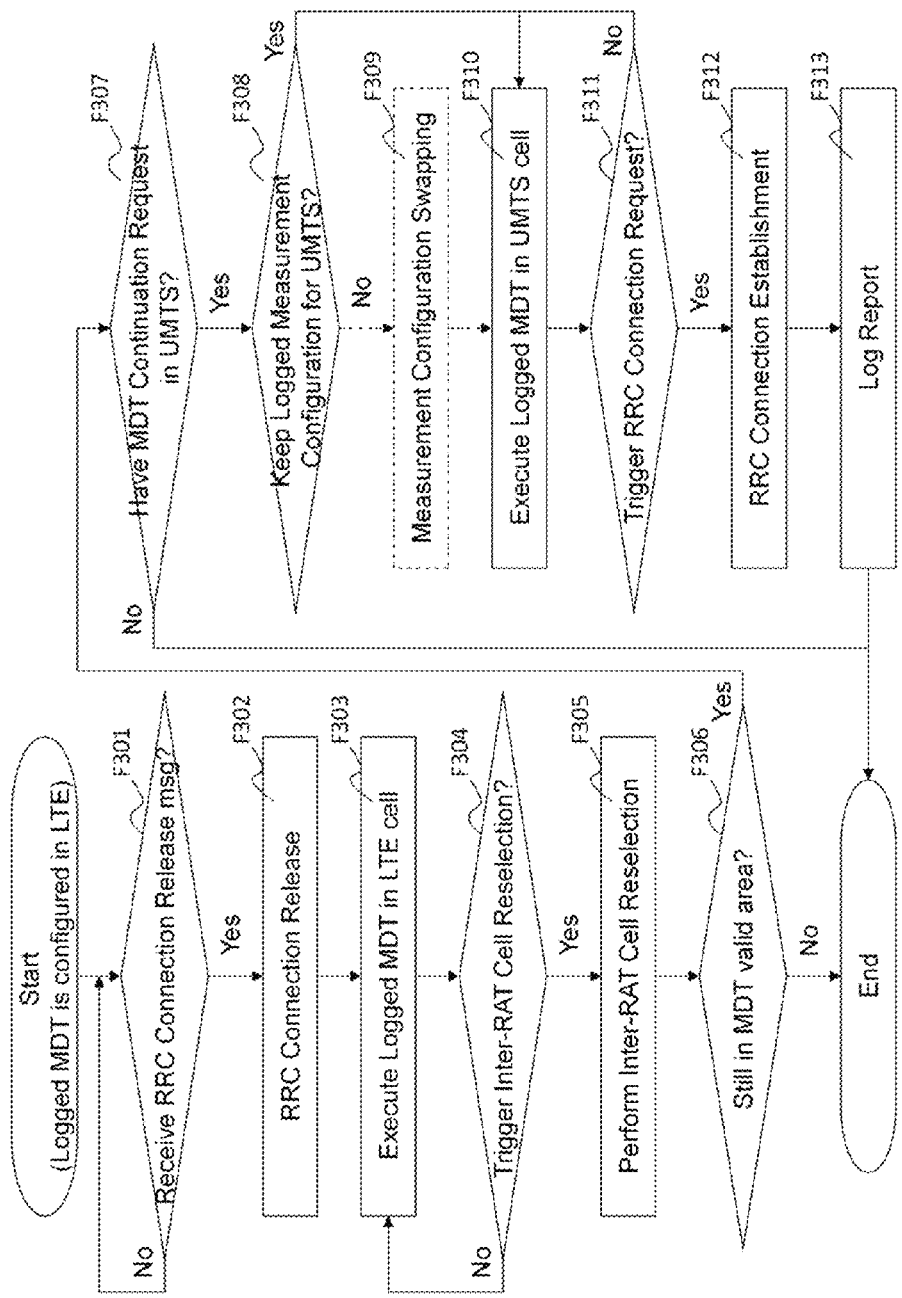
FIG. 11 is a flow chart of an operation of the radio terminal of the third example of the present invention.

FIG. 11 is a flow chart of an operation of the radio terminal UE36 in the third example. Here, in the initial state, the radio terminal UE36 stays in the LIE cell 33 in the RRC_Connected state (that is, the serving cell is the LTE cell).

The radio terminal UE36 determines whether to have received the instruction to release RRC connection from the radio base station eNB 32 (F301: Receive RRC Connection Release msg?). In a case where the radio terminal received the instruction to release the RRC connection (F301 Yes), the radio terminal releases the RRC connection (F302: RRC Connection Release) and executes the Logged MDT in the LTE cell 33 (F303: Execute Logged MDT in LTE cell). The radio terminal UE36 determines whether the cell reselection is required to be performed at predetermined timing (F304: Trigger Inter-RAT Cell Reselection?) and, if it is not required (F304 No), the radio terminal UE36 continues the Logged MDT. In a case where the cell reselection is required to be performed (F304 Yes), according to the third example, the cell reselection is executed to the UNITS cell (F305: Perform Inter-RAT Cell Reselection).

The radio terminal UE36 determines whether a new cell is a target area of the Logged MDT (F306: Still in MDT valid area?) and, if the new cell is not the target area (F306 No), the radio terminal UE36 terminates (or interrupts) the Logged MDT (End). If the new cell is the target area (F306 Yes), the radio terminal UE36 determines whether the continuation of the Logged MDT in the UMTS cell 35 was requested (F307: Have MDT Continuation Request in UNITS?). If the continuation of the Logged MDT was requested (F307 Yes), the radio terminal UE36 determines whether the radio terminal UE36 stores (or received) the configuration information of the Logged MDT for the UMTS (F308: Keep Logged Measurement configuration for UNITS?).

If the radio terminal UE36 stores the configuration information of the Logged MDT for the UNITS (F308 Yes), the radio terminal UE36 executes the Logged MDT in the UNITS cell 35 using the configuration information (F310, Execute Logged MDT in UMTS cell). If the radio terminal UE36 does not store the configuration information of the Logged MDT for the UMTS (F308 No) (e.g., corresponding to the case of S301 a) of FIG. 10), the radio terminal UE36 reuses the configuration information of the Logged MDT of the LTE (F309: Measurement Configuration Swapping) (e.g., corresponding to S306 of FIG. 10) to execute the Logged MDT (F310: Execute Logged MDT in UMTS cell). Then, at a certain time, the radio terminal UE36 determines necessity of the RRC connection establishment (F311: Trigger RRC Connection Request?). If the RRC connection establishment is necessary (or triggered) (F311 Yes), the radio terminal UE36 establishes the RRC connection (F312: RRC Connection Establishment). Then, the radio terminal UE36 reports the logs obtained in the LTE cell and the UMTS cell (F313: Log Report).

By following the above steps, even when the radio terminal UE reselects the cell to move between the different Radio Access Technology (RAT) cells, the radio terminal UE is able to realize continuous obtainment of the measurement information.

In FIG. 11, the determination step in which whether the radio terminal has received the request of the log report from the base station control station RNC/base station NB of the UNITS is decided is omitted and the steps goes on based on the premise that the request was received. Further, it is a matter of course that, even when the radio terminal moves from the UNITS cell to the LTE cell again, continuous obtainment of the measurement information can be realized by performing the same operation as the case where the radio terminal moves from the LTE cell 33 to the UMTS cell 35.

Also, the determination at F306 whether an area is the MDT target area can be made such that, for example, the radio terminal receives system information in the UMTS cell where the radio terminal moved to and determines whether the area is a target PLMN. Similarly, such a method may be also employed that the radio terminal determines whether the area matches the target area information (e.g., global cell ID or TA in the LTE, and global cell ID, RA, or LA in the UMTS). Further, the area determination step may not be performed, or the log obtainment of the Logged MDT may be performed before the area determination step.

Modification of Example 3

Figure 12:
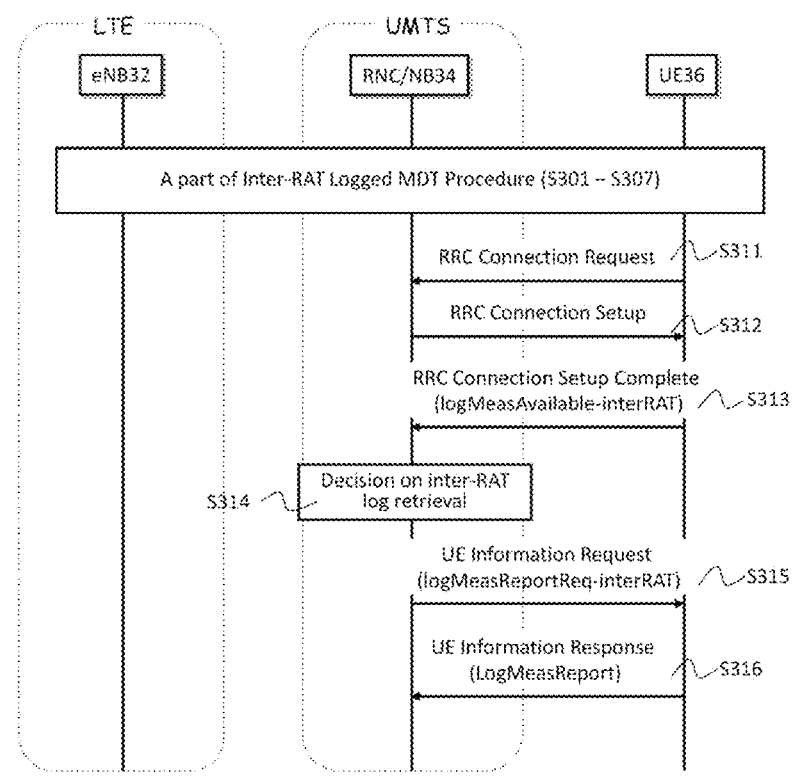
FIG. 12 is a sequence diagram of modified operations of the radio station and the radio terminal of the third example of the present invention.

FIG. 12 illustrates exemplary modification of a third example.

In FIG. 12, such a case is supposed, provided that the steps S301 through S307 of FIG. 10 have been performed, the radio terminal UE36 performs the RRC connection request at predetermined timing.

Step S311: The radio terminal UE36 performs a request for establishing the RRC connection to the base station control station RNC/base station NB34 (RRC Connection Request).

Step S312: The base station control station RNC/base station NB34 notifies control information for establishing the RRC connection to the radio terminal UE36 (RRC Connection Setup).

Step S313: The radio terminal UE36 reports, based on the control information, that the setup required for the RRC connection establishment is completed to the base station control station RNC/base station NB34 (RRC Connection Setup Complete). At this time, the radio terminal also reports that the logs obtained in the LTE cell and the UMTS cell (or at least obtained in the LTE cell) are stored (that is, available) (logMeasAvailable-interRAT). The radio terminal may indicate storing the logs obtained in the LTE cell and the UMTS cell using independent information. For example, it is also possible to indicate, instead of the logMeasAvailable-interRAT, storing the log obtained in the RAT cell where the radio terminal UE stays (logMeasAvailable) and storing the log obtained in the different RAT cell (logMeasAvailable-LTE), or to indicate in which RAT cells the logs were obtained (logMeasAvailable-UMTS and logMeasAvailable-LTE).

Step S314: The base station control station RNC/base station NB34 determines, based on the report on storing the logs, whether to cause the radio terminal UE to perform a report on the logs obtained in the LTE cell and the UMTS cell (Decision on inter-RAT log retrieval). FIG. 12 shows a case where the base station control station RNC/base station NB34 determined to cause the radio terminal UE to perform the report. Here, examples of the other information to be used in determining whether causing the radio terminal UE to perform the report include information indicating terminal capability information of the radio terminal UE and information whether there is (or there was) instruction to execute the Logged MDT across the different RATs from the upper layer network (e.g., EM(S) and CN).

Step S315: The base station control station RNC/base station NB34 requests the radio terminal UE36 to report the logs that the radio terminal UE36 obtained in the LTE cell and the UMTS cell (UE information Request (logMeasReportReq-interRAT)). At S314, in a case where the base station control station RNC/base station NB34 causes the radio terminal UE36 to report only the log that the radio terminal obtained in the cell of the same RAT, that is, in the UMTS cell, it is possible to request a normal log report (UE information Request (logMeasReportReq)).

Step S316: The radio terminal UE36 reports the log in response to the log report request (UE Information Response (LogMeasReport)). Here, the report of the log may be made using the format as shown in FIG. 9.

By following the above steps, in the system in which the radio terminal UE continuously obtains measurement information while the radio terminal UE reselects the cell to move between the different Radio Access Technology (RAT) cells, whether the log of the obtained measurement information is to be reported can be determined according to the situation of the radio network side and the supporting function.

Example 4

A fourth example of the present invention will be described below.

Figure 13:
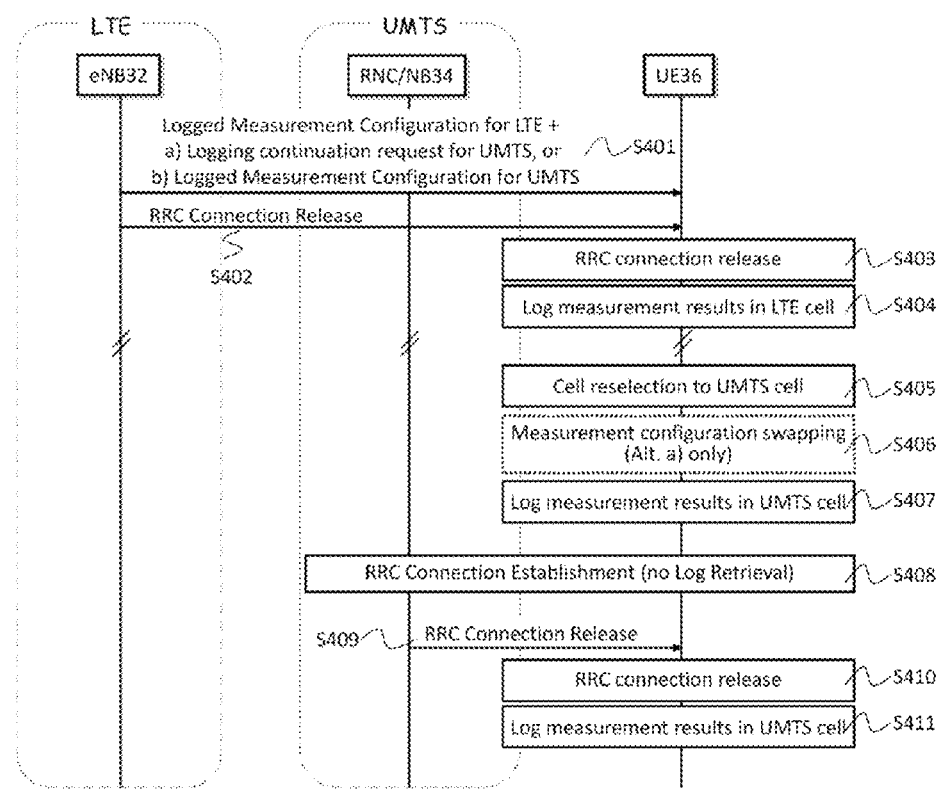
FIG. 13 is a sequence diagram of operations of a radio station and a radio terminal of a fourth example of the present invention.

FIG. 13 is a sequence diagram of operations of the radio station and the radio terminal in the fourth example. In FIG. 13, similar to FIG. 10, the LTE radio base station eNB32 is supposed as the first radio station of the first Radio Access Technology (RAT), and the UMTS base station control station RNS/base station NB34 is supposed as the second radio station of the second Radio Access Technology (RAT). Here, it is provided that the radio terminal UE36 stays in the LTE cell 33.

In the fourth example, the LTE radio base station eB32 instructs the radio terminal UE36 to obtain measurement information in the LTE cell 33 (that is, measurement and recording of the measurement results) to report it and further instructs the radio terminal UE36 to obtain the measurement information in the UMTS cell 35. The fourth example differs from the third example in that the radio terminal only performs continuous obtainment (acquisition) of the measurement information in the UMTS cell 35 as the second cell but does not report on it. Here, similar to the third example, a case where the ISR is applied is supposed.

Step S401: The radio base station eNB32 instructs the radio terminal UE36 to transmit the first configuration information as the instruction of obtainment of and report on the measurement information in the LTE cell 33 (Logged Measurement Configuration for LTE) and further instructs the radio terminal UE36 to obtain the measurement information in the UMTS cell 35. The obtainment of the measurement information in the UMTS cell 35 is instructed by either one of a) transmission of the request to obtain the measurement information in the UNITS cell 35 (Logging continuation request for UMTS) or b) transmission of the second configuration information necessary in obtaining the measurement information in the UMTS cell 35 (Logged Measurement Configuration for UMTS).

Step S402: The radio base station eNB32 instructs the radio terminal UE36 to go to the idle state (RRC_Idle) at predetermined timing (RRC Connection Release).

Step S403: The radio terminal UE36 releases the RRC Connection and goes to the idle state (RRC connection release (go to RRC_IDLE)).

Step S404: The radio terminal UE36 obtains the measurement information in the LTE cell 33 (Log measurement results in LTE cell).

Step S405: The radio terminal UE36 reselects the cell from the LTE cell 33 to the UMTS cell 35 when a predetermined trigger for the cell reselection is happened (Cell reselection to UMTS cell).

Step S406: If the radio terminal UE36 is notified of only the first configuration information (that is, in a case of the option a)), the radio terminal UE36 performs taking over the first configuration information and continuation of the processing based on the first configuration information (e.g., measurement by means of a timer or a counter) (Measurement configuration swapping).

Step S407: The radio terminal UE36 switches the items of the measurement information (that is, measurement items) from those of the LTE to those of the UMTS to obtain the measurement information in the UMTS (Record of measurement results in UMTS cell).

Step S408: The radio terminal UE36 establishes the RRC Connection with the base station control station RNC/base station NB32 when a predetermined trigger for the RRC Connection Establishment is happened (RRC Connection Establishment). Here, the report of the log that the radio terminal stores is not performed (no Log Retrieval).

Step S409: The base station control station RNC/base station NB32 instructs the radio terminal UE36 to go to the idle state at predetermined timing (RRC Connection Release).

Step S410: The radio terminal UE36 releases the RRC Connection and goes to the idle state (RRC connection release).

Step S411: The radio terminal UE36 obtains the measurement information again in the UMTS cell (Log measurement results in UNITS cell).

Through it is not shown here, if the radio terminal UE36 reselects the LTE cell 33 to move again to the LTE cell 33, the radio terminal UE36 restarts the obtainment of the measurement information in the LTE cell 33. Then, if a trigger for the RRC connection establishment is happened in the LTE cell 33, the radio terminal UE36 reports the logs obtained in the LTE cell 33 and the UMTS cell 35 that the radio terminal UE36 stores after the completion of the RRC connection establishment.

By following the above steps, even when the radio terminal UE reselects the cell to move between the different Radio Access Technologies (RAT), the radio terminal UE is able to realize continuous obtainment of the measurement information. As a result, it is possible to grasp the radio wave environment at a point and its adjacent area where the radio terminal moves between the different RAT cells. This enables to realize coverage optimization and mobility optimization by taking into account the cells of plurality of RATs.

Example 5

A fifth example of the present invention will be described below.

Figure 14:
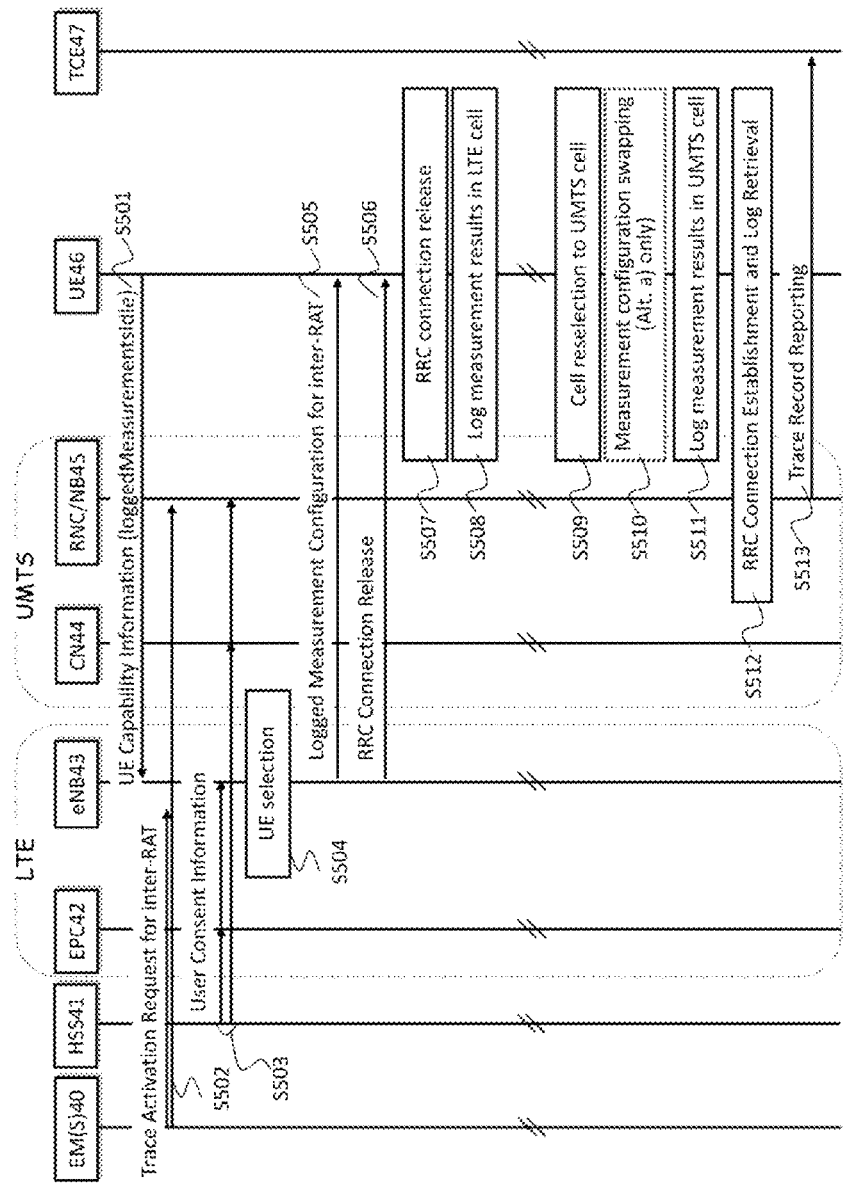
FIG. 14 is a sequence diagram of operations of a radio network and a radio terminal of a fifth example of the present invention.

FIG. 14 is a sequence diagram of operations of the radio network and the radio terminal in the fifth example. In FIG. 14, supposed is a radio communication system including a network operation management apparatus EM(S)40, a home subscriber management server HSS41, an LTE Packet Core Network EPC42 of the first Radio Access Technology (RAT), a radio base station eNB43, a UMTS core network CN44 of the second RATS, a base station control station RNC/base station NB45, radio terminal UE46, and a Trace information collection apparatus TCE47. Also, the management based (Management based) (also referred to as Area based) Logged MDT is employed as the MDT method.

In the fifth example, similar to the third example, the LTE radio base station eNB43 instructs the radio terminal UE46 to obtain the measurement information in the LTE cell and the UMTS cell (that is, measurement and recording of the measurement results) to report it. Here, such a case is supposed, when the radio terminal UE46 in the RRC_Idle state reselects the cell between different RAT cells, that is, between the LTE cell and the LTMTS cell (Inter-RAT Cell Reselection), in so far as there is no change in the location registration areas registered before in the LTE and the UMTS, that the ISR (Idle mode Signaling Reduction) as a function that is able to omit the location registration procedure is applied.

Step S501: The radio terminal UE46 notifies the radio base station eNB43 of support of the logged MDT (logged-MeasurementsIdle) by terminal capability information (UE Capability Information) regarding radio access of the radio terminal UE46. Herein, the terminal capability information may newly define information (e.g., loggedMeasurementsIdle-InterRAT) that indicates having (or whether to have) capability to execute the Logged MDT across the cells of different RATs (that is, to execute the continual Logged MDT after changing the RAT).

Step S502: The network operation management apparatus EM(S)40 requests the LTE radio base station eNB43 and the UMTS base station control station RNC/base station NB44 to start to collect terminal measurement information (Inter-RAT Logged MDT) across multiple RATs by the Logged MDT (Trace Activation Request for Inter-RAT).

Step S503: The home subscriber management server HSS41 notifies a user consent information (User Consent Information) with respect to the detailed location information report of, for example, the GPS in the Logged MDT of the radio terminal UE46 through the LTE Packet Core Network EPC42 and the UMTS Core Network CN44 to the respectively networked radio base station eNB43 and base station control station RNC/base station NB45. Herein, the user consent information includes information such as "Consent" in the case when the radio terminal UE agrees to reporting of the detailed location registration, and "Unconsent" in the case when not agreeing.

Step S504: The radio base station eNB43 selects the radio terminal UE46 that is instructed to execute the Logged MDT according to the start request from the network operation management apparatus EM(S)40, terminal capability information of the radio terminal UE46 and the user consent information (UE selection). For example, the radio base station eNB43 selects the radio terminal UE that agrees (that is, "Consent").

Step S505: The radio base station eNB43 transmits to the selected radio terminal UE46 a message as an instruction for obtainment (acquisition) of and report on the measurement information in the LTE cell and an instruction for obtainment of and report on the measurement information in the UMTS cell (Logged Measurement Configuration for Inter-RAT). Here, the message is transmitted by either one of the following two methods in addition to the transmission of the first configuration information as the instruction for obtainment of and report on the measurement information in the LTE cell (Logged Measurement Configuration for LTE).

a) Transmission of a request for obtaining and reporting the measurement information in the UNITS cell (Logging continuation request for UMTS); and b) Transmission of the second configuration information necessary for obtaining and reporting the measurement information in the UMTS cell (Logged Measurement Configuration for UMTS).

Step S506: The radio base station eNB43 instructs the radio terminal UE46 to go to the idle state (RRC_Idle) at predetermined timing (RRC Connection Release).

Step S507: The radio terminal UE46 releases the RRC Connection to go to the Idle state (RRC Connection Release).

Step S508: The radio terminal UE46 obtains the measurement information in the LTE cell (Log measurement results).

Step S509: The radio terminal UE46 reselects the cell from the LTE cell to the UMTS cell when a predetermined trigger for the cell reselection is happened (Cell reselection to UMTS cell).

Step S510: When the radio terminal UE46 receives a notification that requests obtaining of and reporting on the measurement information in the UNITS cell (that is, in a case of S505 a)), the radio terminal UE46 performs taking over the first configuration information and continuation of the processing based on the first configuration information (e.g., measurement by means of a timer or a counter) (Measurement configuration swapping).

Step S511: The radio terminal UE46 obtains the measurement information in the UMTS cell (Log measurement results in UMTS cell).

Step S512: When a trigger for the RRC connection establishment is happened, the radio terminal UE46 establishes the RRC connection with the base station control station RNC/base station NB45 to report the log that the radio terminal stores (RRC Connection Establishment and Log Retrieval). At this time, the radio terminal UE46 reports the stored log with the addition of information for distinguishing a log obtained in the LTE cell from a log obtained in the UMTS cell.

Step S513: The base station control station RNC/base station NB45 transfers the logs collected from the radio terminal UE46 to the trace information collection apparatus TCE47 (Trace Record Reporting).

By following the above steps, even when the radio terminal UE moves and performs cell reselection between the different Radio Access Technologies (RATs), it is possible to realize the continuous obtainment of the measurement information. As a result, it is possible to grasp the radio wave environment at a point and its adjacent area where the radio terminal moves between the different RAT cells. This enables to realize coverage optimization and mobility optimization by taking into account the cells of plurality of RATs.

Modification of Example 5

Figure 15:
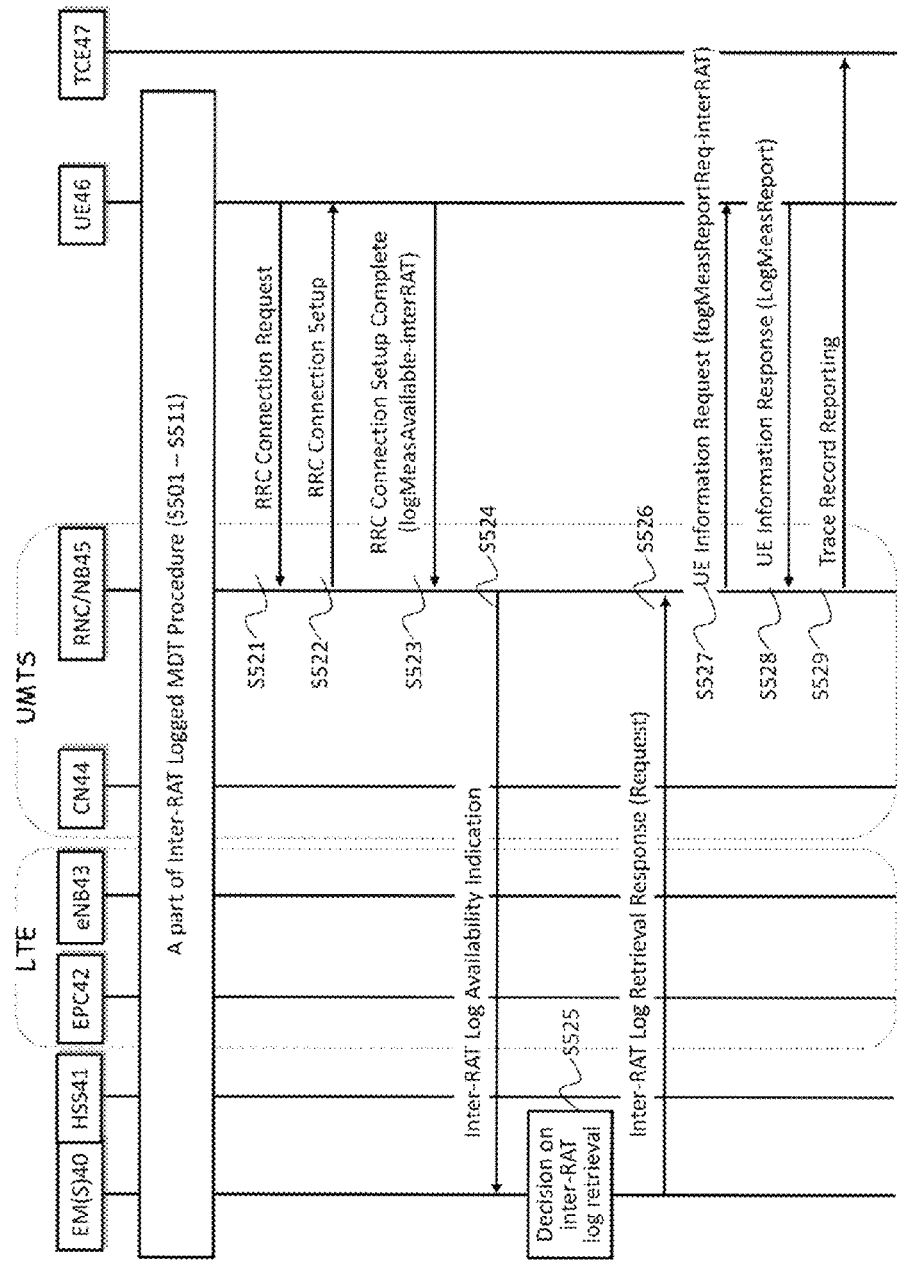
FIG. 15 is a sequence diagram of modified operations of the radio network and the radio terminal of the fifth example of the present invention.

FIG. 15 illustrates an exemplary modification of a fifth example.

In FIG. 15, provided that the steps S501 to S511 of FIG. 14 have been performed, a case where the radio terminal UE issues the RRC connection request at predetermined timing is supposed.

Step S521: The radio terminal UE46 requests the base station control station RNC/base station NB45 to establish the RRC Connection (RRC Connection Request).

Step S522: The base station control station RNC/base station NB45 notifies the radio terminal UE46 of control information for establishing a RRC connection (RRC Connection Setup).

Step S523: The radio terminal UE46 reports the completion of settings necessary for the RRC connection establishment, according to the control information, to the Base station control station RNC/base station NB45 (RRC Connection Setup Complete). At this time, the radio terminal UE46 also reports the storing (that is, the availability) of the logs obtained in the LTE cell and the UMTS cell (the log obtained at least in the LTE cell) (logMeasAvailable-inter-RAT).

Step S524: The base station control station RNC/base station NB45 notifies the network operation management apparatus EM(S)40 of having received a report that a log of different RAT is stored (Inter-RAT Log Availability Indication).

Step S525: The network operation management apparatus EM(S)40 determines whether causing the radio terminal UE46 to report the logs obtained in the LTE cell and the UMTS cell (Decision on inter-RAT log retrieval). Here, such a method is exemplified that a determination is made, for example, based on whether instruction was made in advance to execute the Logged MDT (that is, obtainment (acquisition) of the measurement information) across the different RAT cells or based on whether the execution of the Logged MDT performed across the different RAT cells is necessary.

Step S526: The network operation management apparatus EM(S)40 notifies the base station control station RNC/base station NB45 of a response to the report that a log of different RAT is stored (Inter-RAT Log Retrieval Response). FIG. 15 shows a case where the radio terminal is caused to report the different RAT logs (Request). The response of the EM(S)40 may be performed based on a policy configured in advance by an operator but not limited thereto.

Step S527: The base station control station RNC/base station NB45 requests the radio terminal UE46 to report the logs obtained in the LTE cell and the UNITS cell (UE Information Request (logMeasReportReq-interRAT)).

Step S528: The radio terminal UE46 reports the logs in response to the request of the log report (UE Information Response (LogMeasReport)).

Step S529: The base station control station RNC/base station NB45 transfers the logs collected from the radio terminal UE46 to the trace information collection apparatus TCE47 (Trace Record Reporting).

By following the above steps, in the system in which the radio terminal UE continuously obtains measurement information while the radio terminal UE moves and performs cell reselection between the different Radio Access Technologies (RATs), it is possible to determine whether the log of the obtained measurement information is to be reported according to the status of the radio network side and the supporting function. The steps S524 and S525 may be omitted here.

Alternatively, instead of the network operation management apparatus EM(S), the core network CN (in the case of the LTE, the packet core network EPC) may perform the steps S524 and S525.

Example 6

A sixth example of the present invention will be described below.

Figure 16:
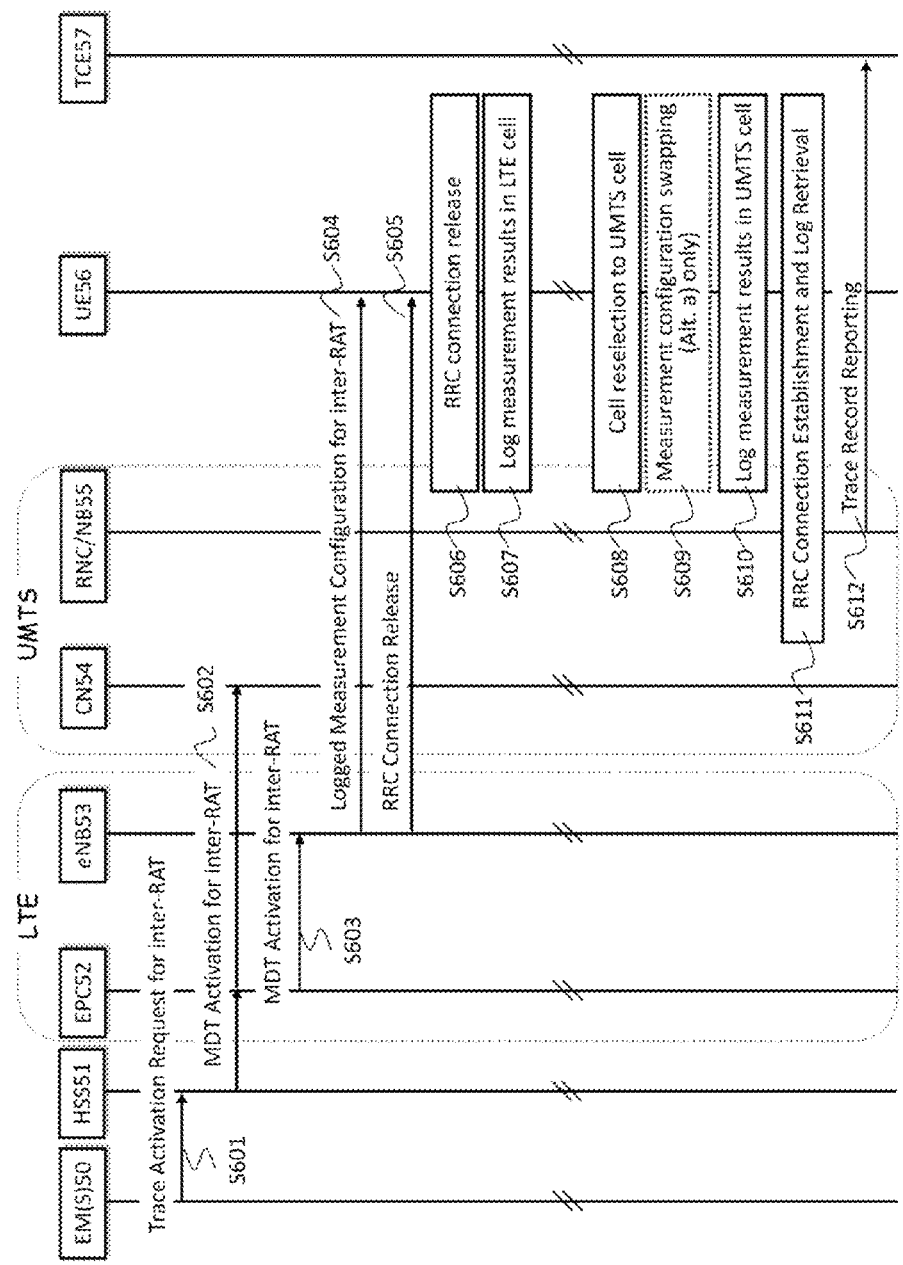
FIG. 16 is a sequence diagram of operations of a radio network and a radio terminal of a sixth example of the present invention.

FIG. 16 is a sequence diagram of operations of the radio network and the radio terminal according to the sixth example. In FIG. 16, supposed is a radio communication system including a Network operation management apparatus EM(S)50, a home subscriber management server HSS51, an LTE Packet Core Network EPC52 of the first Radio Access Technology (RAT), an radio base station eNB53, a UMTS core network CN54 of the second RAT, a base station control station RNC/base station NB55, a radio terminal UE56, and a trace information collection apparatus TCE57. A signaling based (Signaling based) Logged MDT is used as the MDT method. In the sixth example, similar to the fifth example, the LTE radio base station eNB instructs the radio terminal UE to obtain the measurement information in the LTE cell and the UMTS cell (that is, the measurement and recording of the measurement results) to report it. Here, such a case is supposed that, when the radio terminal UE in the RRC_Idle state reselects the cell between the different RAT cells, that is, between the LTE cell and the UMTS cell (Inter-RAT Cell Reselection), in so far as there is no change in location registration areas registered before in the LTE and the UMTS, an ISR (Idle Mode Signaling Reduction) as a function that is able to omit the location registration procedure is applied.

Step S601: The network operation management apparatus EM(S)50 requests the home subscriber management server HSS51 to collect terminal measurement information (Inter-RAT Logged MDT) across multiple RATs for the specified radio terminal UE56 by the Logged MDT (Trace Activation Request for Inter-RAT). Here, the radio terminal UE56 is identified using the IMSI (International Mobile Subscriber Identity) or the IMEI (International Mobile Equipment Identity) as an individual radio terminal ID. Alternatively, it is possible to select the radio terminal UE by taking into account the user consent information (User Consent Information) with respect to the report on the detailed location information of, for example, the GPS of the user who has the radio terminal UE.

Step S602: The home subscriber management server HSS51 transfers an instruction of the Inter-RAT Logged MDT to the packet core network EPC52 of LTE managing an area where the radio terminal UE56 to be a target of the Logged MDT is registered, and to the core network CN54 of UMTS (MDT Activation for Inter-RAT).

Step S603: The LTE Packet Core Network EPC 52 transfers an instruction of the Inter-RAT Logged MDT to the radio base station eNB53 under the control of which the radio terminal UE56 to be a target may exist (MDT Activation for Inter-RAT).

Step S604: The radio base station eNB53 in which the radio terminal UE56 to be a target exists transmits a message as the instruction for obtainment (acquisition) of and report on the measurement information in the LTE cell and a message as the instruction for obtainment of and report on the measurement information in the UMTS cell to the radio terminal UE56 (Logged Measurement Configuration for Inter-RAT). Herein, in addition to transmission of the first configuration information that is an instruction to obtain and report the measurement information in the LTE cell (Logged Measurement Configuration for LTE), the message is transmitted by any of the following two methods.

a) Transmission of a request (Logging continuation request for UMTS) for obtaining and reporting the measurement information in the UMTS cell; and b) Transmission of the second configuration information necessary for obtaining the measurement information in the UMTS cell (Logged Measurement Configuration for UMTS). Step S605: The radio base station eNB53 instructs the radio terminal UE56 to go to the idle state (RRC_Idle) at predetermined timing (RRC Connection Release).

Step S606: The radio terminal UE56 releases the RRC Connection to go to the idle state (RRC connection release).

Step S607: The radio terminal UE56 obtains the measurement information in the LTE cell (Log measurement results).

Step S608: Then a predetermined trigger for cell reselection is happened, the radio terminal UE56 reselects the cell from the LTE cell to the UMTS cell (Cell reselection to UMTS cell).

Step S609: When receiving a request to obtain the measurement information in the UMTS cell to report it (that is, in the case of the method of a) in S604), the radio terminal UE56 performs taking over the first configuration information and continuation of the processing (e.g., the measurement by means of a timer or a counter) based on the first configuration information (Measurement configuration swapping).

Step S610: The radio terminal UE56 obtains the measurement information in the UMTS cell (Log measurement results in UMTS cell).

Step S611: When a predetermined trigger for RRC connection establishment is happened, the radio terminal UE56 establishes the RRC connection with the base station control station RNC/base station NB55 to report the log that the radio terminal UE56 stores (RRC Connection Establishment and Log Retrieval). At this time, the radio terminal UE56 reports the log obtained in the LTE cell in association with information that is able to identify the log obtained in the UMTS cell.

Step S612: The base station control station RNC/base station NB55 transfers the log collected from the radio terminal UE56 to the trace information collection apparatus TCE57 (Trace Record Reporting).

By following the above steps, even when the radio terminal UE moves and performs cell reselection between the different Radio Access Technologies (RATs), it is possible to realize the continuous obtainment (acquisition) of the measurement information. As a result, it is possible to grasp the radio wave environment at a point and its adjacent area where the radio terminal moves between the different RAT cells. This enables to realize coverage optimization and mobility optimization by taking into account the cells of plurality of RATs.

In the above examples of the present invention described above, the descriptions are made on the assumption that the network operation management apparatus EM(S) and the trace information collection apparatus TCE are common between the radio access technologies (RATs). However, the present invention can be applied to the case when EM(S) and TCE are different on per RAT. For example, when the EM(S) is different on per RAT, the EM(S) is able to use a method for notifying a request to obtain measurement information in the second RAT (Logged MDT) while notifying the first configuration information related to obtaining measurement information in the first RAT (Logged MDT). Meanwhile, when the TCE is different on per RAT, for example, the present invention is able to use the method for indicating only the first RAT in relation to TCE information (e.g. TCE IP Address or TCE ID) indicated by the EM(S) in trace related information, specifying the TCE based on TCE information of the first RAT and reporting, when collecting measurement information from the radio terminal UE in the radio station of the second RAT (base station eNB or base station control station RNC/base station NB). Further, when a radio station of the second RAT cannot identify the TCE from TCE information, the process is conceived not to collect the measurement information, or to discard the measurement information even when collecting. Moreover, the process is conceived that the radio station of the second RAT inquires an upper network apparatus such as EM(S) or EPC/CN whether the TCE is necessary, or whether to need to collect measurement information of the different RATs.

In the above embodiment, it is supposed that the 3GPP LTE and UMTS are employed as the radio communication system. The object of the present invention, however, is not limited thereto. The object of the present invention is also applicable to the GSM (Global System for Mobile communications), the WiMAX (Worldwide interoperability for Microwave Access), and the others.

Hereinabove, the embodiments and examples of the present invention have been described and now it is clear from the description that each unit may be constituted by hardware or may be realized using a computer program. In this case, by a processor running on a program in a program memory, a function and an operation similar to those of each of the above embodiments or examples are realized. Also, only a part of the functions of the above embodiments or examples may be realized with the computer program.

One part or an entirety of the above embodiments can be described as the following supplementary notes, but the present invention is not limited to the followings.

(Supplementary note 1) A radio communication system in which radio terminal obtains measurement information designated by a network in an idle state and reports the obtained measurement information in an active state, the system including:
 a radio station configured to operate a first cell of a first Radio Access Technology, wherein, in the first cell, the radio station includes;
  a notifying means configured to notify the radio terminal of first configuration information related to obtainment of the measurement information in the first cell, and
  a request means configured to request the radio terminal to obtain, after the radio terminal moves to a second cell of a second Radio Access Technology different from the first Radio Access Technology, the measurement information in the second cell.

(Supplementary note 2) The radio communication system according to Supplementary note 1, wherein the radio terminal is configured to autonomously obtain, after reselecting the cell from the first cell to the second cell in the idle state, the measurement information in the second cell.

(Supplementary note 3) The radio communication system according to any one of Supplementary note 1 or Supplementary note 2,
 wherein the radio terminal is configured to decide whether the second cell is a target area in which the radio terminal obtains the measurement information and,
 when the second cell is the target area, to obtain the measurement information in the second cell.

(Supplementary note 4) The radio communication system according to any one of Supplementary note 1 to Supplementary note 3, wherein the network includes at least one of the radio station, a network apparatus managing the radio station, and a network operation management apparatus.

(Supplementary note 5) A radio station in a radio communication system in which a radio terminal obtains measurement information designated by a network in an idle state and reports the obtained measurement information in an active state, the radio station including:
 a first radio station configured to operate a first cell of a first Radio Access Technology includes;
  a notifying means configured to notify first configuration information related obtainment of the measurement information in the first cell to the radio terminal staying in the first cell, and
  a request means configured to request the radio terminal staying in the first cell to obtain, after the radio terminal moves to a second cell of a second Radio Access Technology different from the first Radio Access Technology, the measurement information in the second cell, and
 a second radio station configured to operate the second cell includes;
  a receiving means configured to receive, in the second cell, a report on storing the first measurement information obtained in the first cell from the radio terminal, and
  a collection means configured to cause the radio terminal to report the first measurement information.

(Supplementary note 6) The radio station according to Supplementary note 5, wherein, when the second radio station receives the report on the storing of the first measurement information,
 the radio station inquires an upper layer network apparatus or a network operation management apparatus about whether to collect the first measurement information, and
 the radio station receives a response to the inquiry from the network apparatus or the network operation management apparatus to determine whether to cause the radio terminal to perform a report on the first measurement information based on the response.

(Supplementary note 7) A network apparatus causing the radio terminal to obtain measurement information in an idle state and causing the radio terminal to report the obtained measurement information in an active state, the Network apparatus including:
 a notifying means configured to notify a radio station of first configuration information related to obtainment of the measurement information by the radio terminal in the first cell, the radio station being configured to operate a first cell of a first Radio Access Technology where the radio terminal stays; and
 an instruction means configured to instruct the radio station to cause the radio terminal to obtain, after the radio terminal moves to a second cell of a second Radio Access Technology different from the first Radio Access Technology, the measurement information in the second cell.

(Supplementary note 8) The Network apparatus according to Supplementary note 7 configured to receive a request of the notification and the instruction to the radio station from a network operation management apparatus to execute the request.

(Supplementary note 9) The Network apparatus according to Supplementary note 6 or Supplementary note 8, further including
 a radio terminal selection means configured to select a target radio terminal that is caused to obtain, after the radio terminal moves to the second cell, measurement information in the second cell;

wherein the network apparatus issues instructions to the radio station networked to the selected radio terminal.

(Supplementary note 10) The network apparatus according to Supplementary note 9, wherein the radio terminal selection means is configured to select the radio terminal based on a consent information on a report of location information of the radio terminal.

The present invention has been described above with reference to the embodiments and examples. The present invention, however, is not always limited to the above embodiments and examples, but may be modified to be carried out in various forms without departing from the technical concept of the present invention. Each of the embodiments and examples may be combined, as required, for carrying out thereof.

This application claims the benefit of Japanese Application No. 2011-218704, filed on Sep. 30, 2011, the disclosure of which is hereby incorporated by reference.

REFERENCE SIGNS LIST

1 First radio station
2 Second cell
3 Second radio station
4 Second cell
5 Radio terminal
10 Receiver
11 Demodulator
12 Measurement control unit
13 Signal generating unit
14 Transmitter
20 Receiver
21 Demodulator
22 Measuring unit
23 Signal generating unit
24 Transmitter

The invention claimed is:

1. A radio communication system in which a radio terminal obtains measurement information when in an idle state and reports the obtained measurement information when in an active state, the radio communication system comprising a radio station configured to operate a first cell of a first Radio Access Technology, wherein the radio station comprises:
a memory that stores a set of instructions; and
at least one processor configured to execute the set of instructions to:
transmit, to the radio terminal, first configuration information related to obtainment of first measurement information in the first cell as the measurement information; and
transmit a request to the radio terminal to cause the radio terminal to obtain, based on a part of the first configuration information and after the radio terminal moves to a second cell of a second Radio Access Technology different from the first Radio Access Technology, second measurement information in the second cell as the measurement information.

2. The radio communication system according to claim 1, wherein the radio terminal obtains, after moving from the first cell to the second cell, the second measurement information.

3. The radio communication system according to claim 2, wherein the radio terminal:
stores information identifying, as an obtainment target for the measurement information, first measurement items or second measurement items; and
switches, after moving from the first cell to the second cell, the obtainment target from the first measurement items to the second measurement items.

4. The radio communication system according to claim 2, wherein the radio terminal uses, after moving to the second cell, at least a part of the first configuration information to obtain the second measurement information.

5. The radio communication system according to claim 1, wherein the first configuration information comprises at least any one of:
an absolute time as a reference time which starts logging of the measurement information,
a logging duration of the measurement information, a logging interval of the measurement information,
a logging target area of the measurement information, and trace-related information.

6. The radio communication system according to claim 5, wherein the radio terminal uses at least any one of the absolute time, the logging duration, the logging interval, and the trace-related information to obtain the measurement information.

7. The radio communication system according to claim 1, wherein the request includes the at least a part of first configuration information.

8. A radio terminal obtaining measurement information when in an idle state and reporting the obtained measurement information when in an active state, the radio terminal comprising:
a memory that stores a set of instructions; and
at least one processor configured to execute the set of instructions to:
receive, from a radio station that operates a first cell of a first Radio Access Technology, first configuration information related to obtainment of first measurement information in the first cell as the measurement information;
receive, from the radio station, a request to obtain second measurement information of a second cell of a second Radio Access Technology different from the first Radio Access Technology as the measurement information after the radio terminal moves to the second cell; and
obtain, based on at least a part of the configuration information, the second measurement information after receiving the request and after moving to the second cell.

9. The radio terminal according to claim 8, wherein the at least one processor is further configured to execute the set of instructions to obtain, after the radio terminal moves from the first cell to the second cell, the second measurement information.

10. The radio terminal according to claim 9, wherein the at least one processor is further configured to execute the set of instructions to:
store information identifying, as an obtainment target for the measurement information, first measurement items or second measurement items; and
switch, after the radio terminal moves from the first cell to the second cell, the obtainment target from the first measurement items to the second measurement items.

11. The radio terminal according to claim 9, wherein the at least one processor is further configured to execute the set of instructions to use, after the radio terminal moves to the second cell, at least a part of the first configuration information to obtain the second measurement information.

12. The radio terminal according to claim 8, wherein the first configuration information includes at least any one of:

an absolute time as a reference time which starts logging of the measurement information, logging duration of the measurement information, a logging interval of the measurement information, a logging target area of the measurement information, and trace-related information.

13. The radio terminal according to claim 12, wherein the at least one processor is further configured to execute the set of instructions to use at least any one of the absolute time, the logging duration, the logging interval, and the trace-related information to obtain the measurement information.

14. The radio terminal according to claim 13, wherein the at least one processor is further configured to execute the set of instructions to continue obtainment of the measurement information using at least one of the logging duration and the logging interval.

15. The radio terminal according to claim 8, wherein the at least one processor is further configured to execute the set of instructions to:

obtain, based on second configuration information related to obtainment of the second measurement information received from the radio station, the second measurement information.

16. The radio terminal according to claim 8, wherein the at least one processor is further configured to execute the set of instructions to:

distinguish the first measurement information obtained in the first cell from the second measurement information obtained in the second cell.

17. The radio terminal according to claim 16, wherein the at least one processor is further configured to execute the set of instructions to:

report, to the radio station in addition to the obtained at least one of the first measurement information or the second measurement information, information indicating a Radio Access Technology corresponding to the obtained at least one of the first measurement information or the second measurement information.

18. The radio terminal according to claim 8, wherein the request includes the at least a part of first configuration information.

19. A radio station in a radio communication system, in which a radio terminal obtains measurement information when in an idle state and reports the obtained measurement information when in an active state, wherein the radio station is configured to operate a first cell of a first Radio Access Technology, the radio station comprising:

a memory that stores a set of instructions; and at least one processor configured to execute the set of instructions to:

after a determination that the radio terminal stays in the first cell, transmit, to the radio terminal, first configuration information related to obtainment of first measurement information in the first cell as the measurement information; and transmit a request to the radio terminal to cause the radio terminal to obtain, based on at least a part of the first configuration information, second measurement information of a second cell of a second Radio Access Technology different from the first Radio Access Technology after the radio terminal moves to the second cell as the measurement information.

20. The radio station according to claim 19, wherein the first configuration information contains at least any one of:

an absolute time as a reference time which starts logging of the measurement information, a logging duration of the measurement information, a logging interval of the measurement information, a logging target area of the measurement information, and trace-related information.

21. The radio station according to claim 19, wherein the at least one processor configured to execute the set of instructions to transmit, to the radio terminal, second configuration information related to obtainment of the second measurement information.

22. The radio station according to claim 19, wherein the request includes the at least a part of first configuration information.

23. A network apparatus causing a radio terminal to obtain measurement information when in an idle state and causing the radio terminal to report the obtained measurement information in an active state, the network apparatus comprising:

a memory that stores a set of instructions; and at least one processor configured to execute the set of instructions to:

transmit, to a radio station operating a first cell of a first Radio Access Technology where the radio terminal stays, first configuration information related to obtainment of first measurement information in the first cell by the radio terminal as the measurement information; and transmit a request to the radio terminal to cause the radio terminal to obtain, based on at least a part of the first configuration information after the radio terminal moves to a second cell of a second Radio Access Technology different from the first Radio Access Technology, second measurement information in the second cell as the measurement information.

24. The network apparatus according to claim 23, wherein the request includes the at least a part of first configuration information.

25. An information collection method in which a radio terminal obtains measurement information when in an idle state and reports the obtained measurement information when in an active state, the information collection method comprising:

after determining that the radio terminal stays in a first cell of a first Radio Access Technology, transmitting, to the radio terminal, first configuration information related to obtainment of first measurement information in the first cell as the measurement information; and transmitting a request to the radio terminal to cause the radio terminal to obtain, based on at least a part of the first configuration information, second measurement information in a second cell of a second Radio Access Technology different from the first Radio Access Technology after the radio terminal moves to the second cell as the measurement information.

26. An information collection method in which radio terminal obtains measurement information when the radio terminal is in an idle state and reports the obtained measurement information when the radio terminal is in an active state, the information collection method comprising:

receiving, from a radio station that operates a first cell of a first Radio Access Technology, first configuration information related to obtainment of first measurement information in the first cell as the measurement information;

receiving, from the radio station, a request to obtain second measurement information of a second cell of a second Radio Access Technology different from the first Radio Access Technology after the radio terminal moves to the second cell as the measurement information; and obtaining, based on at least a part of the configuration information, the second measurement information after receiving the request and after moving to the second cell.

27. The method according to claim 26, wherein the request includes the at least a part of first configuration information.

* * * * *

UNITED STATES PATENT AND TRADEMARK OFFICE
CERTIFICATE OF CORRECTION

PATENT NO. : 9,565,600 B2
APPLICATION NO. : 14/348575
DATED : February 7, 2017
INVENTOR(S) : Hisashi Futaki Page 1 of 1

It is certified that error appears in the above-identified patent and that said Letters Patent is hereby corrected as shown below:

On the Title Page

Item (57), Lines 5-6 of Abstract, "con to operate" should read --configured to operate--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*